United States Patent
Brennan et al.

(10) Patent No.: US 8,348,642 B2
(45) Date of Patent: Jan. 8, 2013

(54) ACTIVE MUD VALVE SYSTEM

(75) Inventors: Willam E. Brennan, Richmond, TX (US); Bill Grant, Austin, TX (US); Mark Milkovisch, Cypress, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 905 days.

(21) Appl. No.: 12/412,551

(22) Filed: Mar. 27, 2009

(65) Prior Publication Data

US 2009/0260798 A1  Oct. 22, 2009

Related U.S. Application Data

(63) Continuation-in-part of application No. 11/931,824, filed on Oct. 31, 2007, now Pat. No. 7,527,070.

(51) Int. Cl.
*F16K 17/26* (2006.01)

(52) U.S. Cl. .................... 417/437; 417/392; 137/493

(58) Field of Classification Search .............. 137/493.9, 137/493, 270; 417/437, 393, 394, 395, 392
See application file for complete search history.

(56) References Cited

U.S. PATENT DOCUMENTS

| | | | |
|---|---|---|---|
| 2,459,148 A | 1/1949 | Christensen | |
| 2,934,080 A | 4/1960 | Rice | |
| 3,456,442 A | 7/1969 | Brooks | |
| 3,861,414 A | 1/1975 | Peterson, II | |
| 4,437,385 A | 3/1984 | Kramer | |
| 4,439,984 A | 4/1984 | Martin | |
| 4,830,583 A * | 5/1989 | Edson | 417/318 |
| 4,860,581 A | 8/1989 | Zimmerman et al. | |
| 4,936,139 A | 6/1990 | Zimmerman et al. | |
| 5,473,939 A | 12/1995 | Leder et al. | |
| 5,509,437 A | 4/1996 | Merrett | |
| 5,651,389 A * | 7/1997 | Anderson | 137/565.11 |
| 5,807,389 A * | 9/1998 | Gardetto et al. | 606/17 |
| 5,819,853 A | 10/1998 | Patel | |
| 5,927,402 A | 7/1999 | Benson et al. | |
| 6,302,216 B1 | 10/2001 | Patel | |
| 6,808,023 B2 | 10/2004 | Smith et al. | |
| 8,021,128 B2 * | 9/2011 | Pearson | 417/375 |
| 2008/0053212 A1 | 3/2008 | Brennan et al. | |
| 2008/0156486 A1 | 7/2008 | Ciglenec et al. | |
| 2008/0245569 A1 | 10/2008 | Nold et al. | |

FOREIGN PATENT DOCUMENTS

GB  2391239  2/2004

* cited by examiner

*Primary Examiner* — Ehud Gartenberg
*Assistant Examiner* — Vikansha Dwivedi
(74) *Attorney, Agent, or Firm* — John Vereb; Michael Flynn

(57) ABSTRACT

A downhole tool pumping apparatus comprising a body and an active valve block. The body comprises a cavity housing a reciprocating piston defining first and second chambers within the cavity. The active valve block comprises a plurality of active valves, wherein the plurality of active valves includes a first active valve fluidly connected to the first chamber of the body, the plurality of active valves includes a second active valve fluidly connected to the second chamber of the body, and each of the plurality of active valves is configured to be actively actuated between open and closed positions.

14 Claims, 28 Drawing Sheets

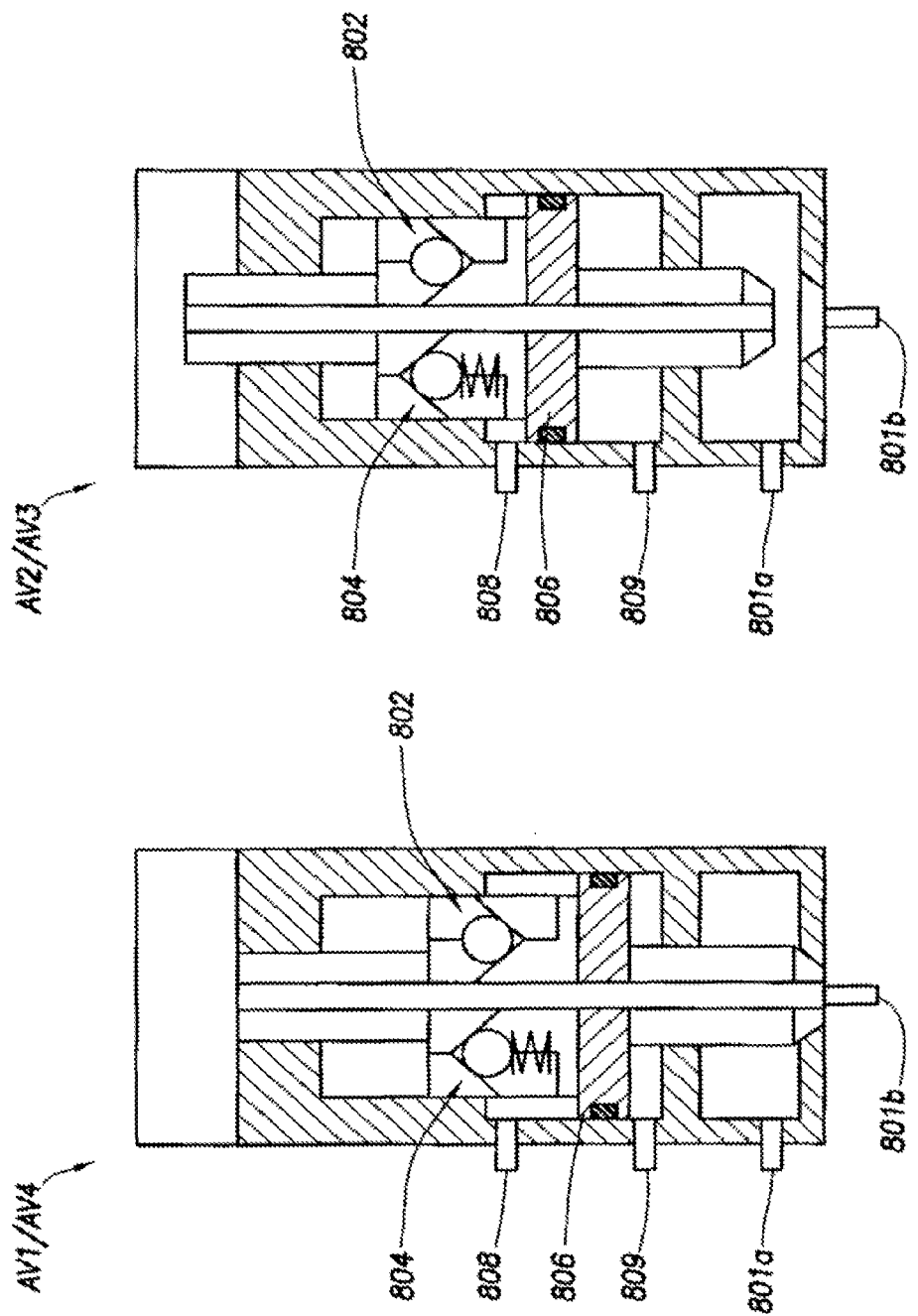

ACTIVE MUD VALVE SYSTEM

CROSS-REFERENCE TO RELATED APPLICATIONS

This application is a continuation-in-part of U.S. patent application Ser. No. 11/931,824, entitled "Flow Control Valve and Method," filed Oct. 31, 2007 now U.S. Pat. No. 7,527,070, the disclosure of which is hereby incorporated herein by reference.

BACKGROUND OF THE DISCLOSURE

FIGS. 1 and 2 illustrate a prior art downhole tool A which can be suspended from a rig 5 by a wireline 6 and lowered into a well bore 7 for the purpose of evaluating surrounding formations 1. Details relating to apparatus A are described in U.S. Pat. Nos. 4,860,581 and 4,936,139, both assigned to Schlumberger, the entire contents of which are hereby incorporated by reference. The downhole tool A has a hydraulic power module C, a packer module P, and a probe module E. The hydraulic power module C includes pump 16, reservoir 18, and motor 20 to control the operation of the pump 16. Low oil switch 22 also forms part of the control system and is used in regulating the operation of the pump 16.

The hydraulic fluid line 24 is connected to the discharge of the pump 16 and runs through hydraulic power module C and into adjacent modules for use as a hydraulic power source. In the embodiment shown in FIG. 1, the hydraulic fluid line 24 extends through the hydraulic power module C into the probe modules E and/or F depending upon which configuration is used. The hydraulic loop is closed by virtue of the hydraulic fluid return line 26, which in FIG. 1 extends from the probe module E back to the hydraulic power module C where it terminates at the reservoir 18.

The tool A further includes a pump-out module M, seen in FIG. 2, which can be used to dispose of unwanted samples by virtue of pumping fluid through the flow line 54 into the borehole, or may be used to pump fluids from the borehole into the flow line 54 to inflate the straddle packers 28 and 30 (FIG. 1). Furthermore, pump-out module M may be used to draw formation fluid from the borehole via the probe module E or F, and then pump the formation fluid into the sample chamber module S against a buffer fluid therein. In other words, the pump-out module is useful for pumping fluids into, out of, and (axially) through the downhole tool A.

A displacement unit (pump) 92, energized by hydraulic fluid from a hydraulic pump 91, can be configured in various configurations, e.g., to draw from the flow line 54 and dispose of the unwanted sample though flow line 95, or it may be configured to pump fluid from the borehole (via flow line 95) to flow line 54. The pump-out module M can also be configured where flowline 95 connects to the flowline 54 such that fluid may be drawn from the downstream portion of flowline 54 and pumped upstream or vice versa. The pump-out module M has the necessary control devices to regulate the displacement unit 92 and align the fluid line 54 with fluid line 95 to accomplish the pump-out procedure.

With reference now to FIGS. 3A-B and 4A-B, a particular embodiment of the pump-out module M (FIG. 2) using four reversible mud check valves 390 (also referred to as CMV1-CMV4) to direct the flow of the fluid being pumped is depicted. These reversible valves 390 allow the module M to pump either up or down (assuming a vertical borehole section) or in our out (depending on the tool configuration), and utilize a spring-loaded ceramic ball 391 that seals alternately on one of two O-ring seats 393a, 393b to allow fluid flow in only one direction. The O-ring seats are mounted in a sliding piston-cylinder 394, also called a check valve slide or simply a piston slide.

More particularly, FIGS. 3A-B show the respective first and second strokes of the two-stroke operation of the displacement unit 392 with the pump-out module M configured to "pump-in" mode, where fluid is drawn into the module M through a port 346 (e.g., a probe) for communication via a flow line 354. Thus, the solenoid valves S1, S2 are energized in FIGS. 3A-B so as to direct hydraulic fluid pressure to shift piston slides 394 of check valves CMV1 and CMV2 upwardly and shift piston slides 394 of check valves CMV3 and CMV4 downwardly. This results in the upper springs 395a of check valves CMV1 and CMV2 biasing the respective balls 391 against the lower seal seats 393b, and the lower springs 395b of check valves CMV3 and CMV4 biasing the respective balls 391 against the upper seal seats 393a. This allows fluid to flow upwardly through valve CMV2 and downwardly through valve CMV4 (both shown slightly opened) under movement of the displacement unit piston 392p to the left (the first stroke), as indicated by the directional arrows of FIG. 3A. Similarly, this allows fluid to flow upwardly through valve CMV1 and downwardly through valve CMV3 (both shown slightly opened) under movement of the displacement unit piston 392p to the right (the second stroke), as indicated by the directional arrows of FIG. 3B. Sufficient fluid-flowing pressure (e.g., >50 psig) is needed to overcome the respective spring-biasing forces. Solenoid valve S3 is provided to selectively move piston 392p from the position in FIG. 3A to the position in FIG. 3B and back. Solenoid valve S3 is also preferably linked to solenoid valves S1 and S2 to synchronize the timing therebetween.

FIGS. 4A-B, on the other hand, show the respective first and second strokes of the two-stroke operation of the displacement unit 392 with the pump-out module M configured in a "pump-out" mode, where fluid is discharged from the flow line 354 through the port 346 into the borehole. Thus, the solenoid valves S1, S2 have been de-energized in FIGS. 4A-B so as to direct hydraulic pressure to shift piston slides 394 of check valves CMV1 and CMV2 downwardly and shift piston slides 394 of check valves CMV3 and CMV4 upwardly. This results in the lower springs 395b of check valves CMV1 and CMV2 biasing the respective balls 391 against the upper seal seats 393a, and the upper springs 395a of check valves CMV3 and CMV4 biasing the respective balls 391 against the lower seal seats 393b. This allows fluid to flow downwardly through valve CMV1 and upwardly through valve CMV3 (both shown slightly opened) under movement of the displacement unit piston 392p to the left (the first stroke), as indicated by the directional arrows of FIG. 4A. Similarly, this allows fluid to flow downwardly through valve CMV2 and upwardly through valve CMV4 (both shown slightly opened) under movement of the displacement unit piston 392p to the right (the second stroke), as indicated by the directional arrows of FIG. 4B. Again, sufficient fluid-flowing pressure (e.g., >50 psig) is needed to overcome the respective spring-biasing forces.

In each of the FIGS. 3A-B and 4A-B, the check valves having no directional flow arrows are configured such that their respective balls 391 are subjected to fluid pressure assisting the spring-biasing forces, i.e., further compressing each ball against an o-ring seat to maintain a seal. Conversely, when the direction of fluid flow opposes the spring-biasing forces (and overcomes them), a gap is opened between the ball and the seat so as to permit the fluid flow indicated by the directional arrows. The valves open just enough to balance the pressure differential across the opening with the biasing forces provided by the respective springs.

Thus, the fluid being pumped through the tool A flows directly past the O-ring seats 393a,b at various intervals during the two-stoke pumping cycles. Since this fluid (e.g., formation fluid and/or borehole fluid) is often laden with impurities varying from fine mud particles to abrasive debris of various sorts, such flow can and often does produce accelerated wear of the O-ring seats. This wear can shorten the life of the O-rings, and lead to frequent failure of the seals. The following are examples of failures that may occur: 1) the O-ring is gradually worn during the pumping process until it will no longer seal; 2) debris (anything from LCM to heavy oil) gets trapped between the ball and one or both of the O-ring seats; 3) fine particles settle out in the valve cavity, and gradually build up to the point where they will prevent the ball from being able to seal against the seat; and 4) filters that are typically used with such valves are susceptible to plugging. The failure of any one of the four reversible mud check valve seals typically reduces the output of displacement unit 392 down to about half, and the loss of two seals may completely disable the displacement

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 8B and 8C are schematic views of a portion of the apparatus shown in FIG. 8A.

DETAILED DESCRIPTION

Figure 1:
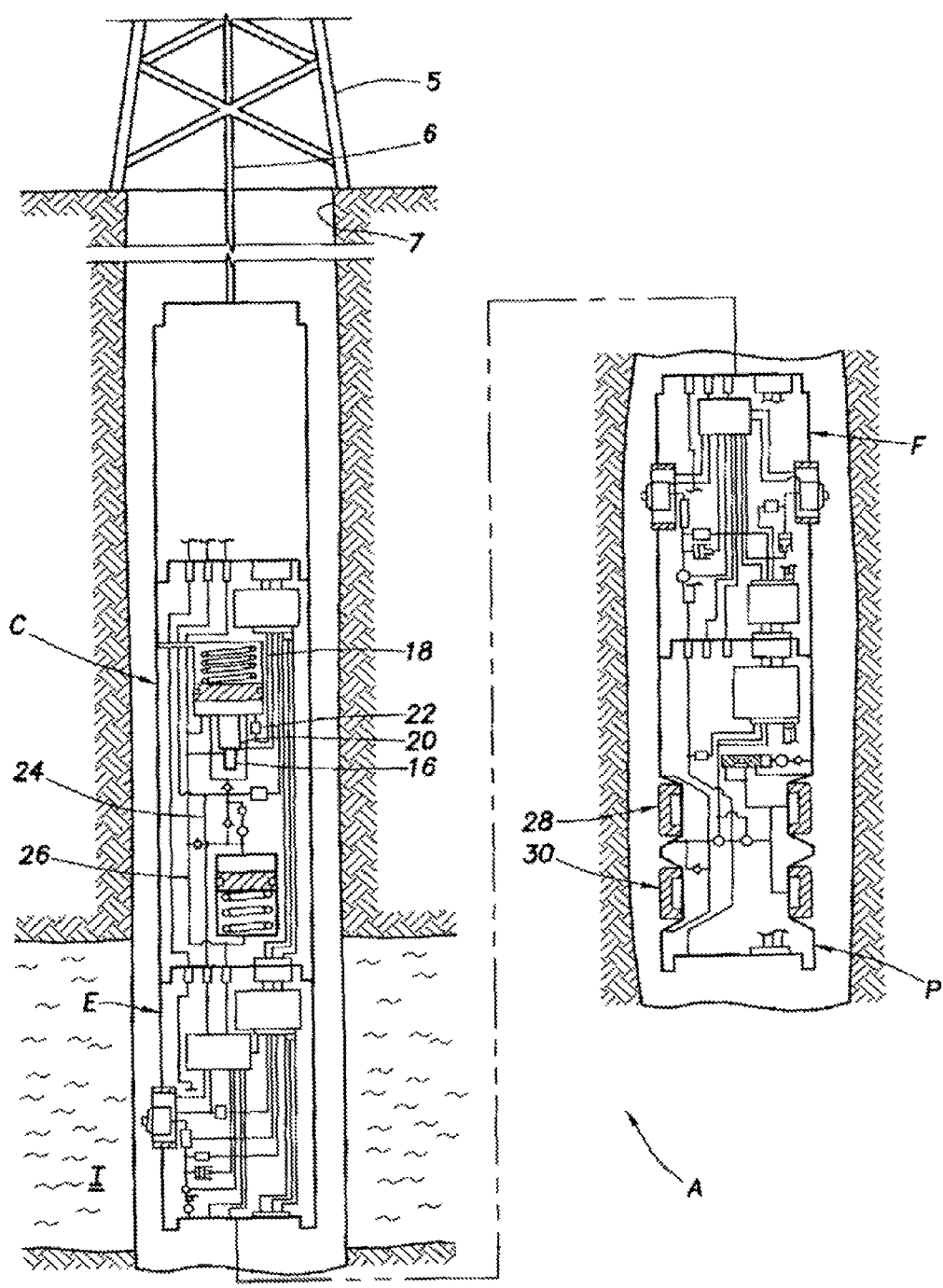
FIGS. 1-2 are schematic views of a wireline-conveyed downhole tool with which one or more aspects of the present disclosure may be used.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Figure 2:
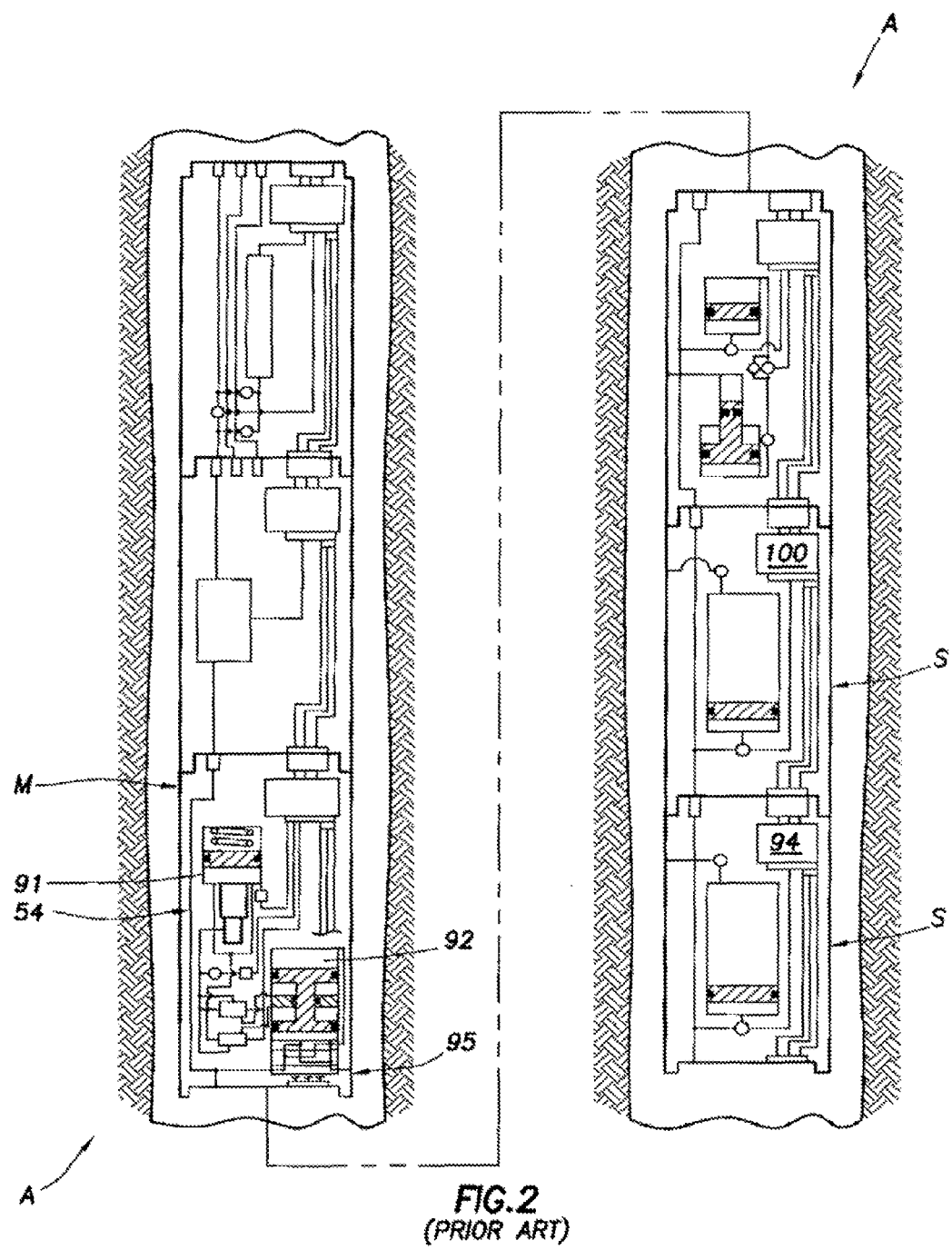
Figure 3A:
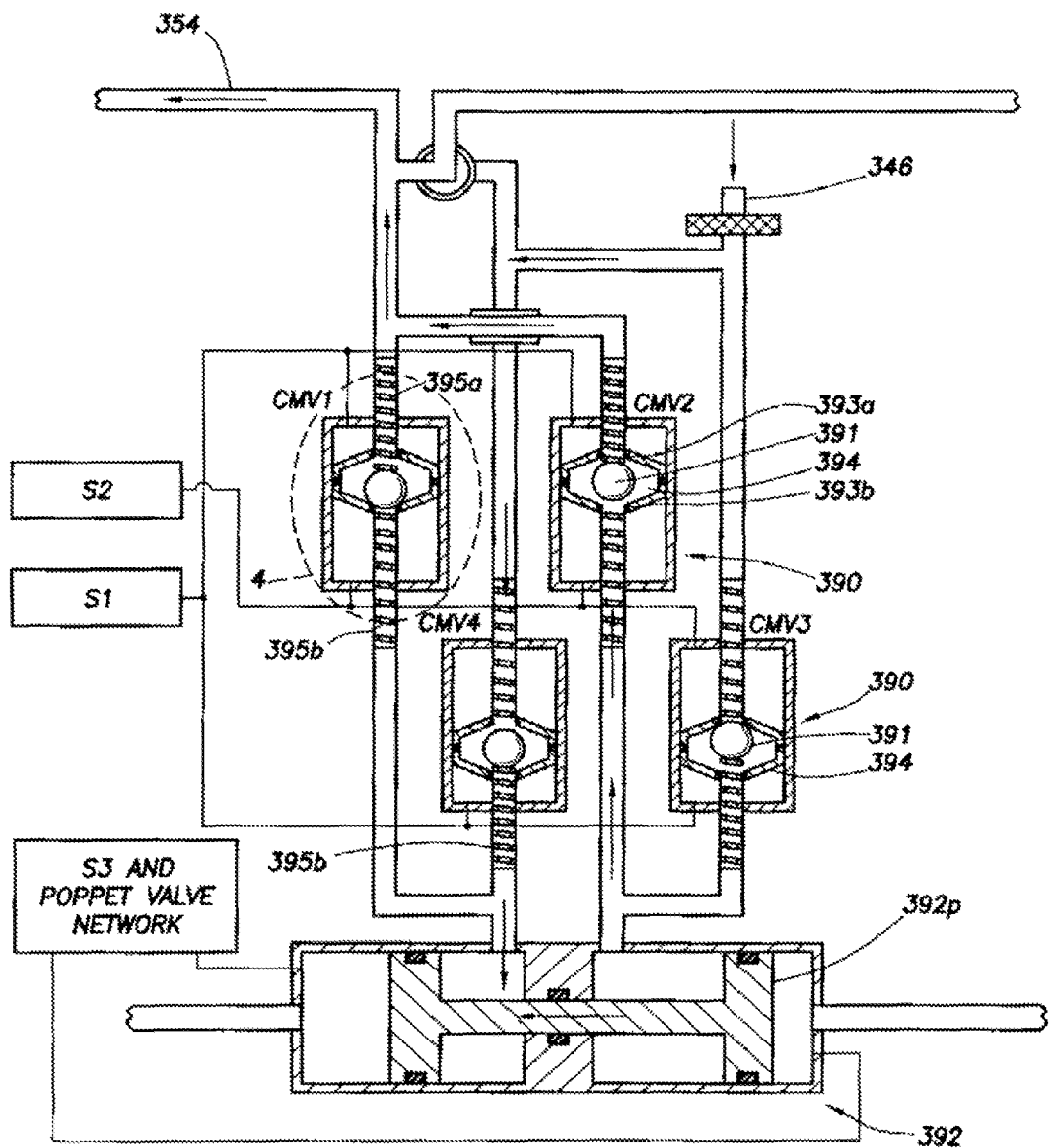
FIGS. 3A-B are schematic views of a prior art fluid pumping module.
Figure 3B:
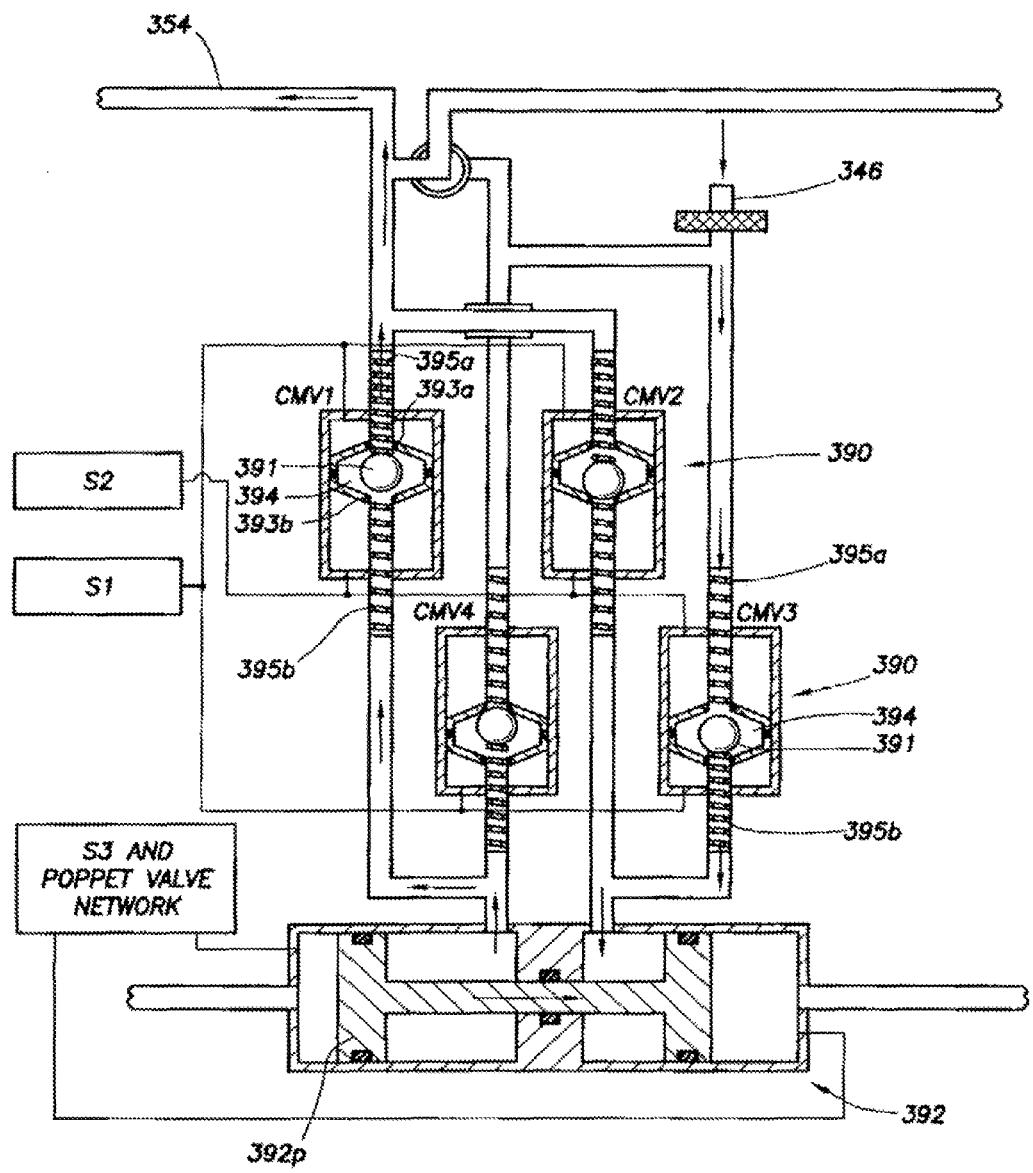
Figure 4A:
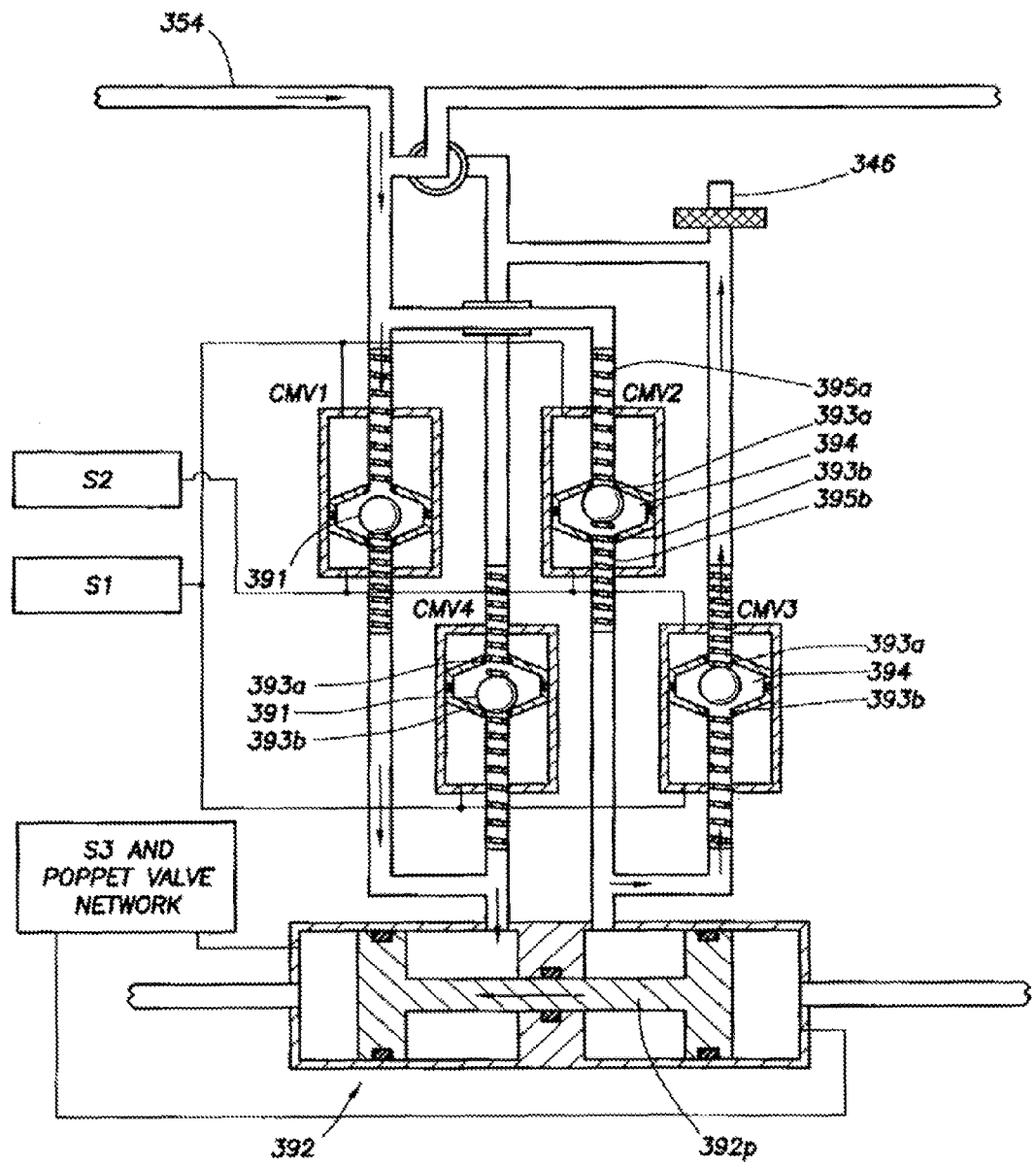
FIGS. 4A-B are schematic views of the fluid pumping module of FIGS. 3A-B.
Figure 4B:
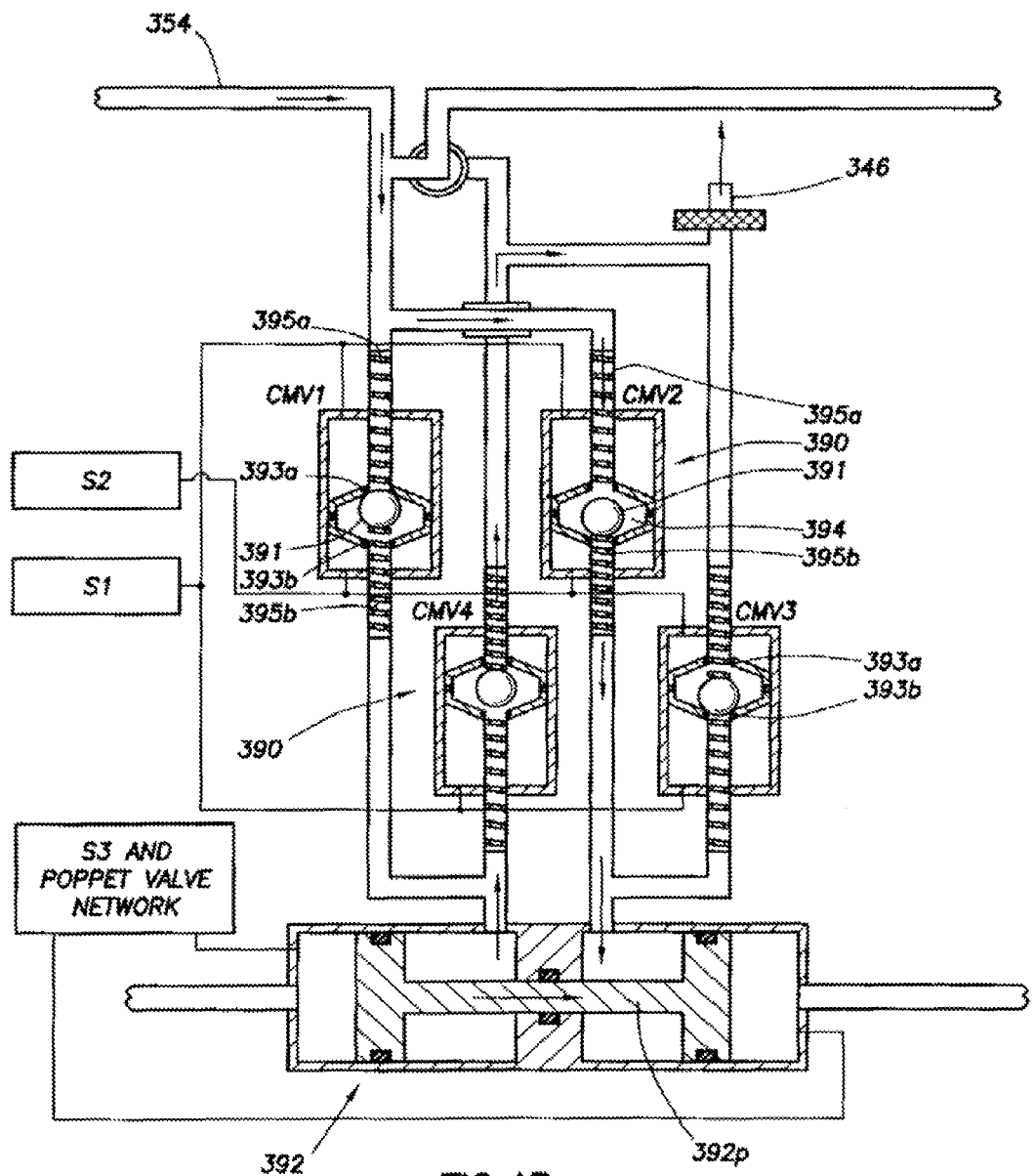
Figure 5A:
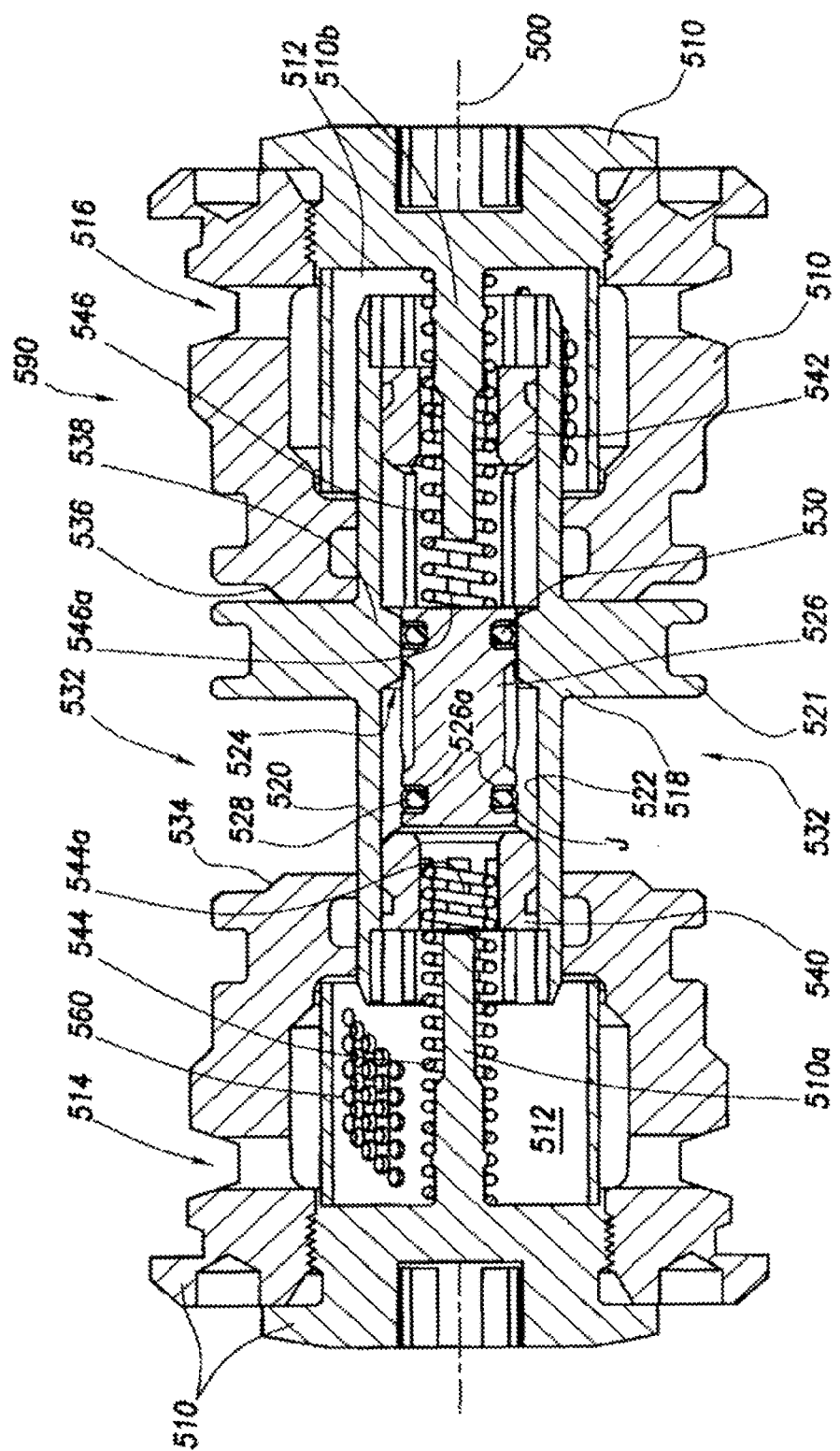
FIGS. 5A-B are schematic views of apparatus according to one or more aspects of the present disclosure.
Figure 5B:
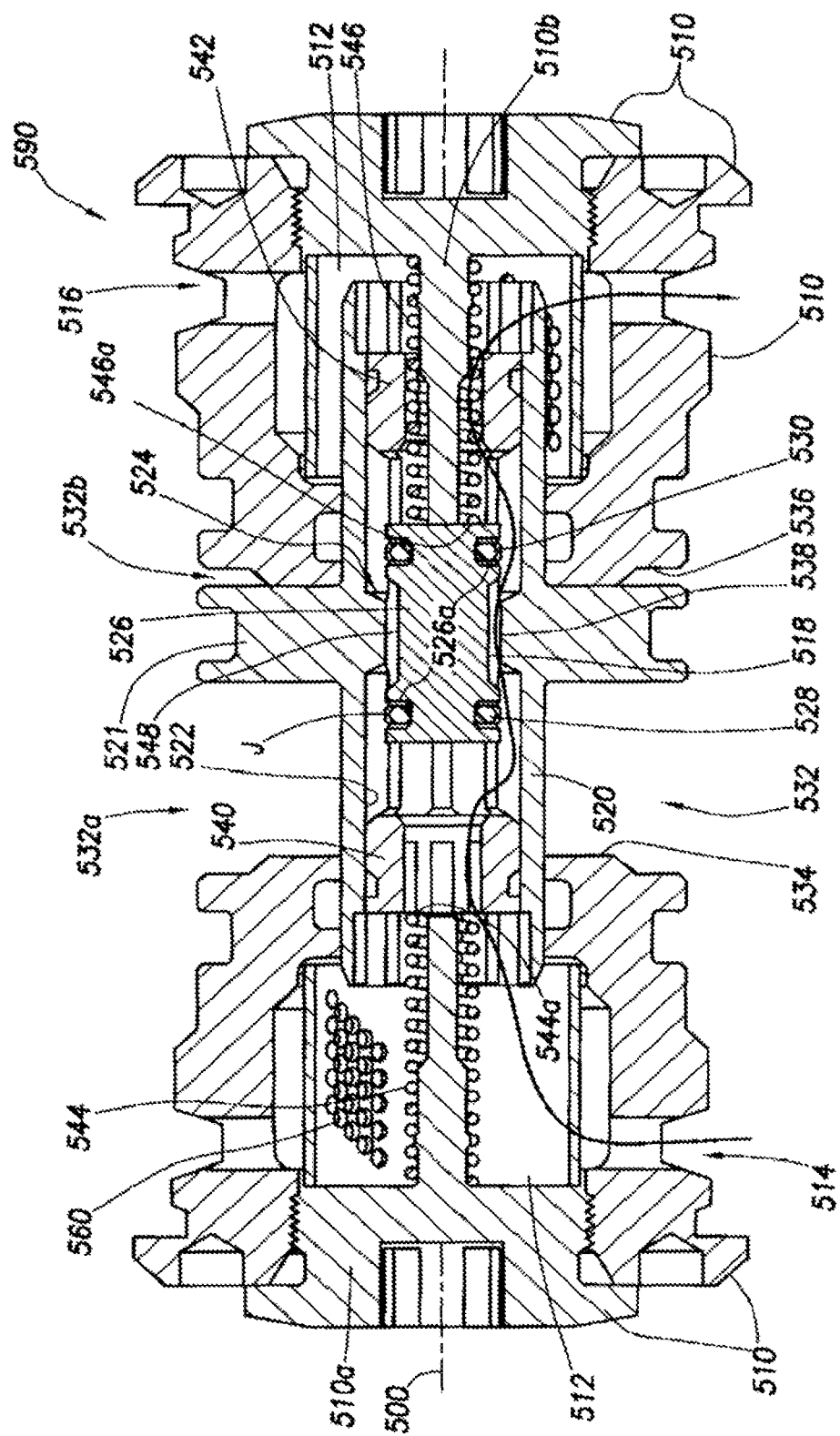

FIGS. 5A-B are schematic views of a flow control valve 590 in respective closed and open positions according to one or more aspects of the present disclosure. The valve 590 may be used as a check valve, e.g., as a replacement for check valve CMV1 (also referenced as 390) of FIGS. 3-4 within a downhole tool (see, e.g., tool A of FIGS. 1-2) adapted for use in a borehole environment. Accordingly, the check valve 590 includes a body 510 having a fluid passageway 512 therethrough and first and second openings 514, 516 each adapted for receiving or discharging fluid from the passageway 512.

A piston 518 is slidably disposed in the passageway 512 between the first and second openings 514, 516 of the body 510. The piston 518 has a conduit portion 520 that defines a bore 522 therethrough for conducting fluid through a portion of the passageway 512. The bore 522 has a reduced flow area 524 (described further below). Components such as piston 518 are also referred to in the relevant art as a sliding cylinder, a check valve slide, or simply a piston slide.

A plug 526 is carried within the body 512, and more particularly within the piston bore 522 of the piston 518. The plug 526 is substantially cylindrical and is equipped with a pair of annular recesses (not numbered) for carrying a respective pair of annular seals 528, 530. Each annular seal has a sealing face J oriented substantially perpendicularly to the axis 500 of the passageway 512. The annular seals may be elastomeric O-rings, or various other materials, as dictated by the operating temperatures and pressures in the downhole environment. The annular seals 528, 530 are adapted for sealably engaging the reduced flow area 524 of piston bore 522 so as to close the bore upon translatory movement of the plug 526 relative to the piston 518. FIG. 5A shows the annular seal 530 engaging the reduced flow area 524 so as to close the piston bore 522. This represents one of the closed configurations for the check valve 590.

The valve body 510 has a central annular opening 532 defined by opposing side walls 534, 536 intermediate the first and second openings 514, 516. The piston 518 is equipped with an outer annular flanged portion 521 intermediate its ends. The flanged portion 521 is disposed within the central annular opening 532 of the body 510 so as to divide the central annular opening into first and second chambers 532a,b. Accordingly, differential pressure across the chambers 532a,b, such as provided by pressurized hydraulic fluid in a known manner, induces reciprocal translatory movement of the piston 518 within the passageway 512 of the body 510.

The conduit portion 520 of the piston 518 is further equipped with an inner flange 538 that defines the reduced flow area 524. Tubular stop members 540, 542 are secured on each side of the inner flange 538 for limiting translatory movement of the plug 526 within the piston bore 522.

The check valve 590 further includes a pair of coil springs 544, 546 each having a first end 544a, 546a slidably disposed at least partially within one of the respective tubular stop members 540, 542 and a second end (not numbered) secured to inner stem-like portions 510a, 510b of the body 510. Each first coil spring ends 544a, 546a yieldably limits translatory movement of the plug 526 within the piston bore, as described further below.

Thus, increasing the pressure of the first chamber 532a above that of the second chamber 532b induces translatory movement of the piston 518 within the passageway 512 of the body 510 to one of two stop positions. In the stop position of FIGS. 5A-B, the outer flanged portion 521 of the piston 518 abuts a portion of the side wall 536 of the central annular opening 532. The tubular stop members 540, 542 are thereby moved with the piston 518 such that the first tubular stop member 540 engages one end of the plug 526 (see FIG. 5A) and moves the plug to a position where its annular seal 530 engages the inner flange 538 of the piston 518 so as to close the piston bore 522, and thus the valve 590. Those having ordinary skill in the art will appreciate that, due to the spring loading on the plug 526, the plug will be positioned—in the "no flow" condition—such that one of the annular seals 528, 530 engages the inner flange 538 to close the bore 522. This is true whether the piston 518 is positioned at the stop position of FIGS. 5A-B or the opposing stop position (not shown) abutting side wall 534.

From the position of FIG. 5A, the plug 526 is constrained to movement towards the coil spring 546 opposite the engaged tubular stop member 540. Such movement occurs when the plug 525 is energized by the pressure of fluid (e.g., sampled formation fluid) flowing through the passageway 512 from the first opening 514 to the second opening 516. Thus, the fluid flows from left to right (e.g., under the reciprocating action of a pump like pump 392 of FIGS. 3A-D) as indicted by the arrows (FIG. 5B) and is directed against the engaged end of the plug 526. This increases the fluid pressure in the passageway 512 behind (to the left of) the plug 625 until sufficient force is developed to overcome the bias of coil spring 546 and move the annular seal 530 out of engagement with the inner flange 538. In other words, the fluid pressure moves the plug 526 from the closed position of FIG. 5A to the open position of FIG. 5B by compressing the coil spring 546 so that it yields to such movement. It will therefore be recognized that the plug 526 essentially functions as an inner piston that is slidable within piston 518. The ends of the body stems 510a and 510b act as hard limits on the range of translator movement by the plug 526, and thus limit the range of yielding by the coil spring 546. It will therefore be appreciated by those having ordinary skill in the art that a function of the coil springs 544, 546 is to bias the plug 526 towards a position where one of the annular seals 528, 530 engages the inner flange 538 so as to close the bore 522 and prevent fluid flow through the valve passageway 512.

The central portion of the plug 526 has a reduced diameter 548 that allows fluid flow around it (see FIG. 5B). The piston bore 522 has slots at the sides of the inner flange 538 that facilitate fluid flow about the plug 526. The slots are tapered from a very small opening close to the reduced flow area 524 in the center of the inner flange 538, to a fuller cross section consistent with the piston bore diameter employed along most of the of the piston conduit 520. This is intended to cause higher flow velocity when one of the plug's annular seals 528, 530 is close to the inner flange 538 so as to prevent fluid-born particles from accumulating and interfering with the operation of the seals. When so-equipped, the plug also provides a self-cleaning action as it opens and closes the piston bore 522, pushing any debris out of the way of the seal. These advantages obviate the need for an upstream particle filter, which other valve systems require to avoid build-up at the seals. Such a filter may, however, be optionally included. Accordingly, an upstream particle filter 560 is (partially) shown in the left portion of passageway 560. Another upstream particle filter (not shown) may be used in the right portion of the passageway as well, since fluid may flow in either direction through the passageway.

It will be also appreciated by those skilled in the art that the annular seal configurations of the present disclosure are more robust than the O-ring seats of FIGS. 3-4, since the majority of the fluid flow will not be directed against the seal (as in FIGS. 3-4), but would instead pass by the inner tapered edges 526a of the plug 526, which would bear most of the flow force.

Figure 6A:
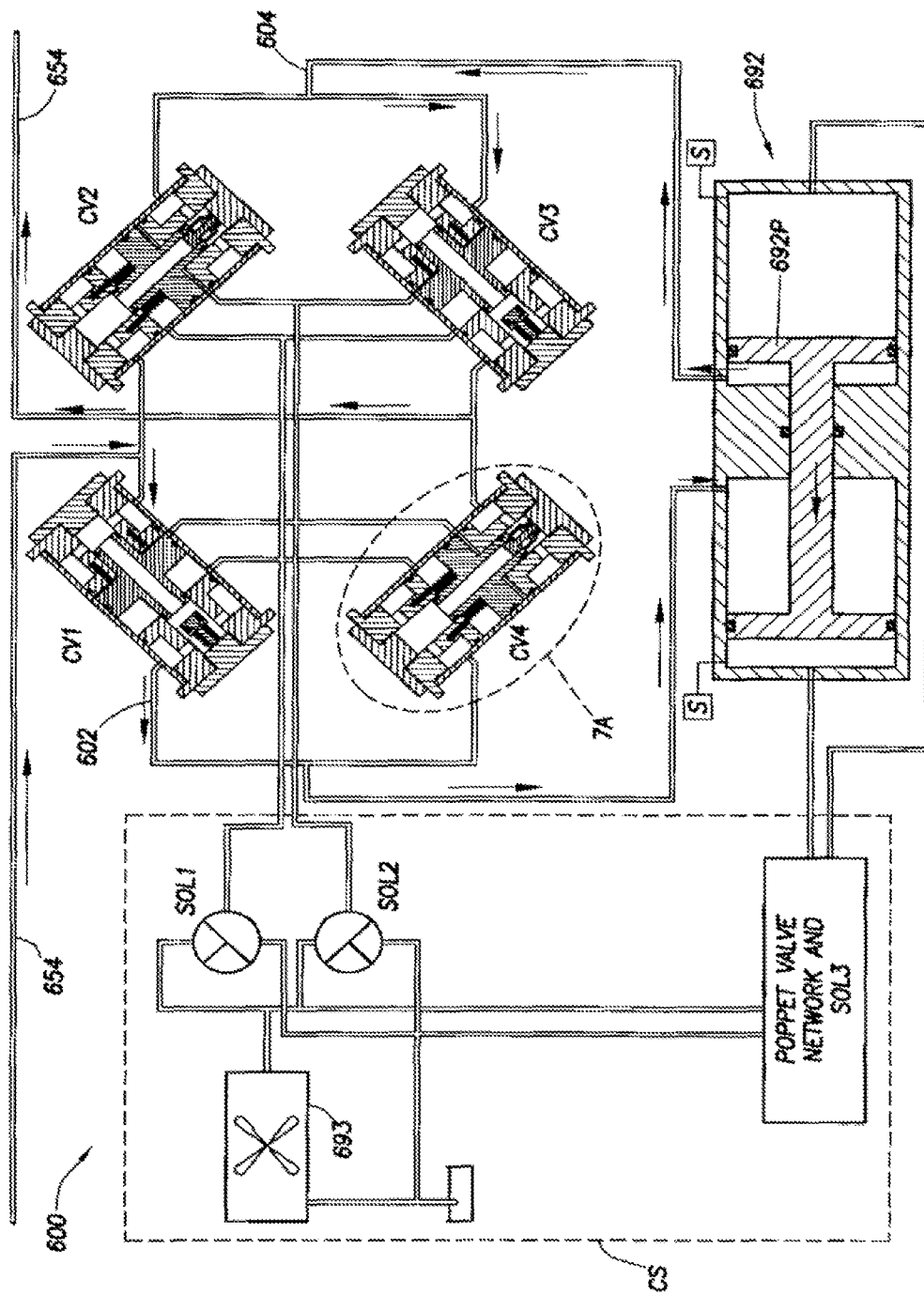
FIGS. 6A-D are schematic views of apparatus according to one or more aspects of the present disclosure.
Figure 6B:
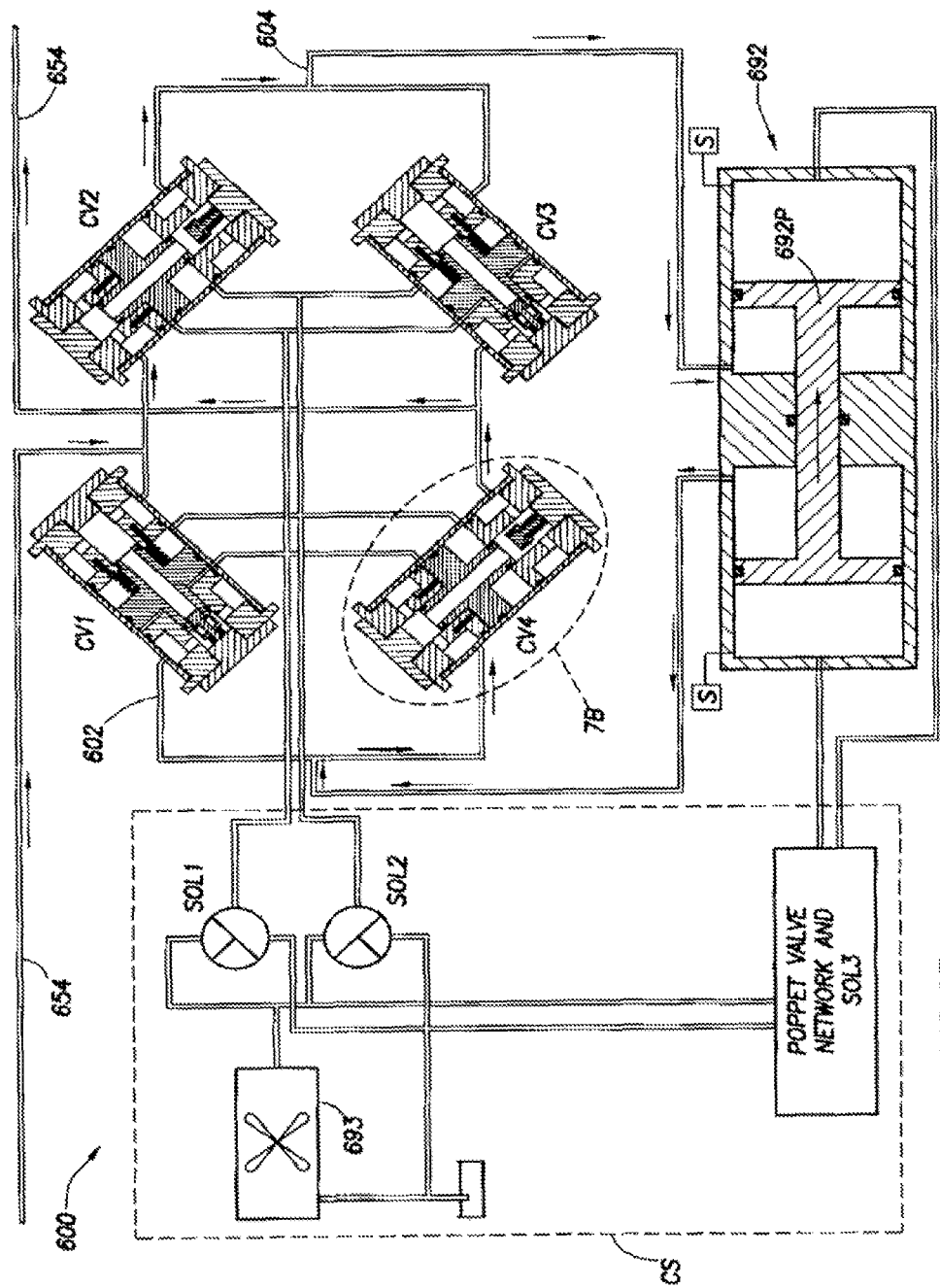
Figure 6C:
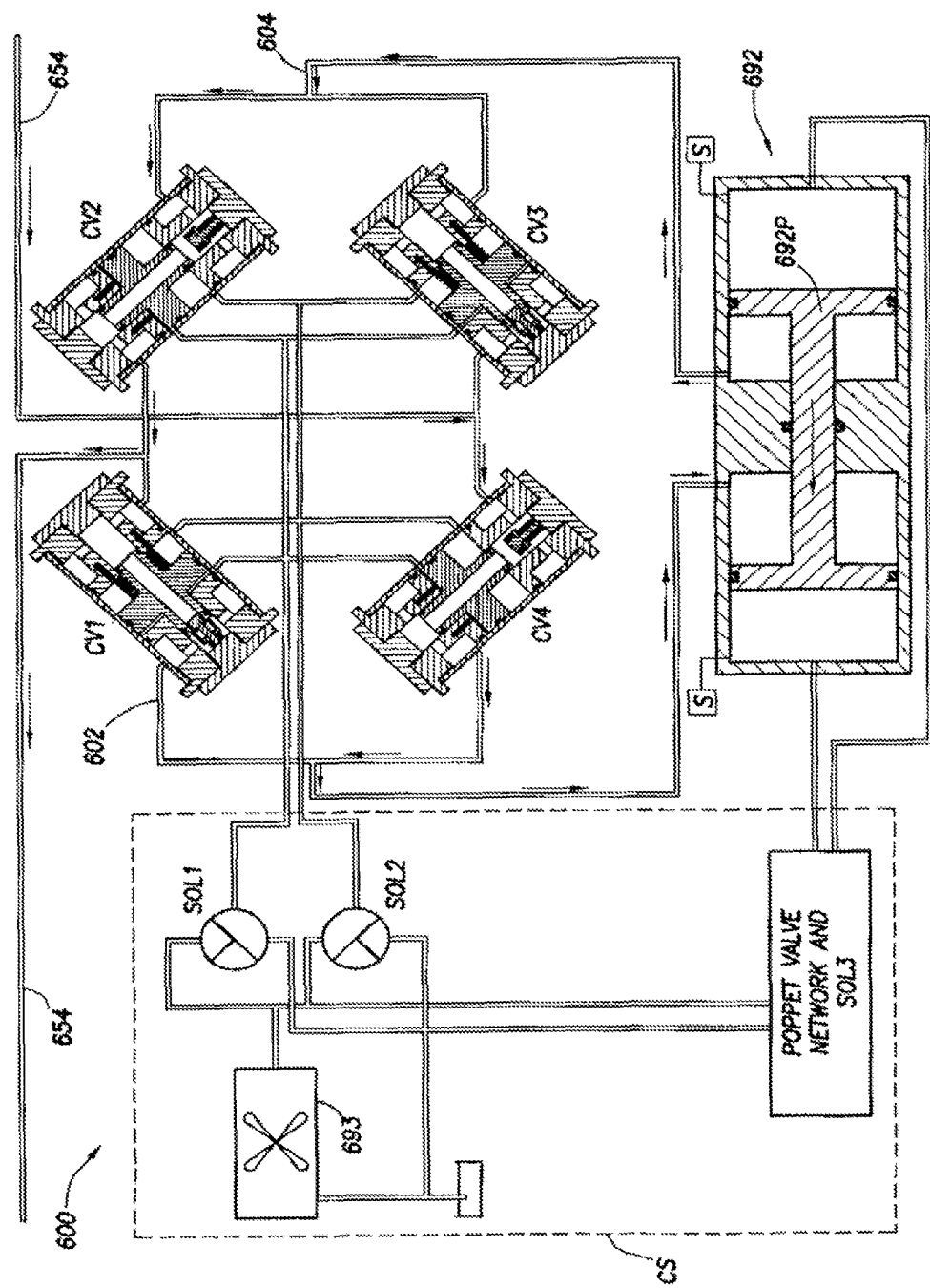
Figure 6D:
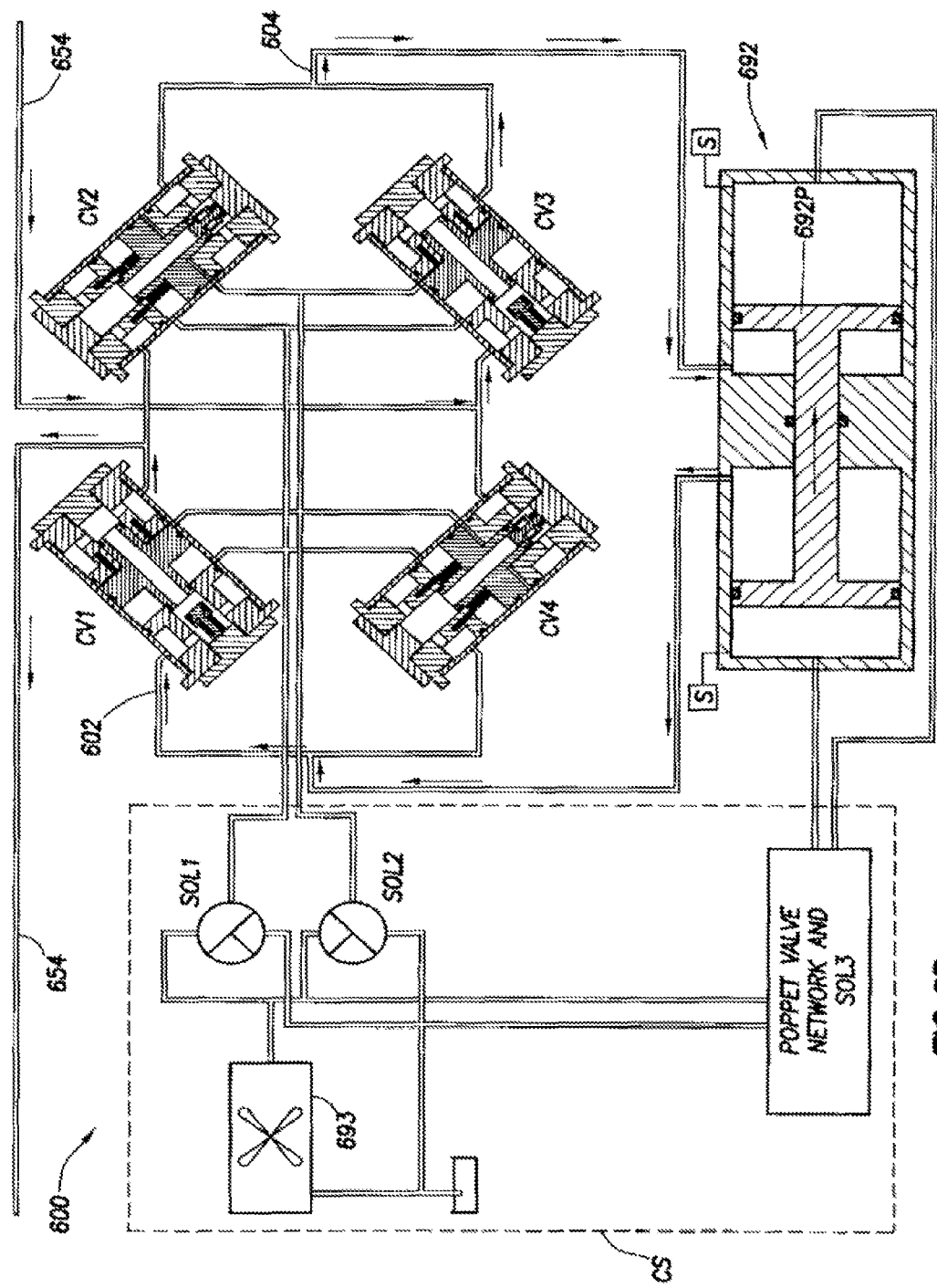
Figure 7A:
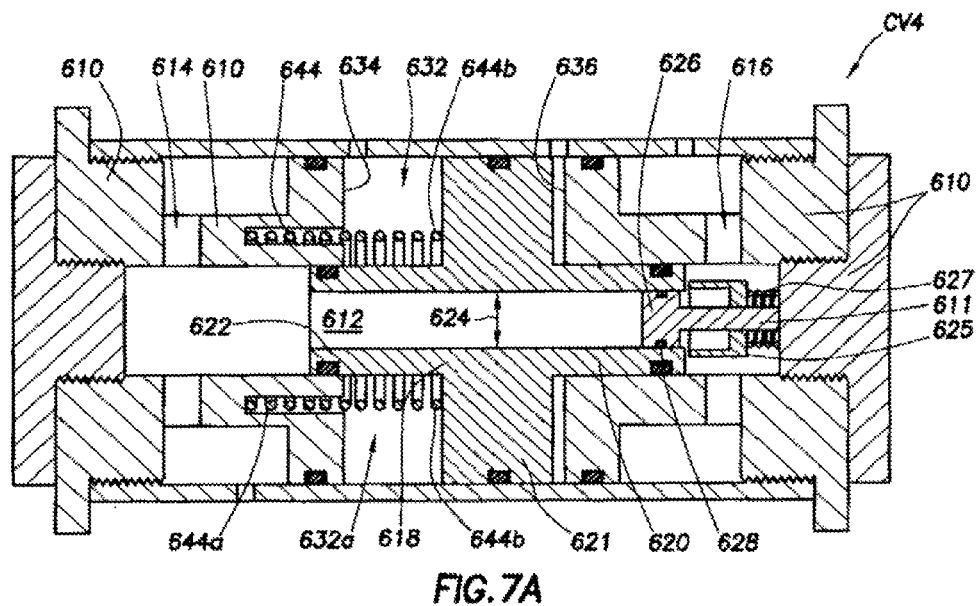
FIGS. 7A-B are schematic views of apparatus according to one or more aspects of the present disclosure.
Figure 7B:
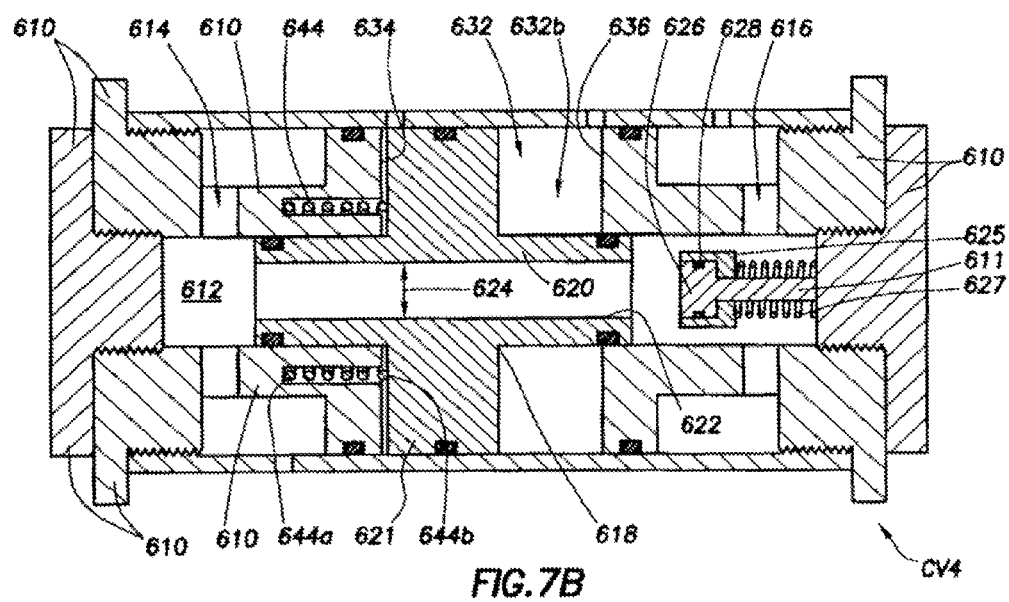

Turning now to FIGS. 6A-D and 7A-B, another embodiment of the present disclosure will now be described. FIGS. 6A-B are schematic illustrations of a pumping assembly 600 employing control valve settings and flow directions according to first and second respective strokes of a two-stroke piston "pump-up" cycle. FIGS. 6C-D are schematic illustrations of the pumping assembly 600 employing control valve settings and flow directions according to first and second respective strokes of a two-stroke piston "pump-down" cycle. FIG. 7A is a detailed sectional schematic of one of the control valves, as positioned in FIG. 6A. FIG. 7B is a detailed sectional schematic of the same control valve, as positioned in FIG. 6B.

The assembly 600 of FIGS. 6A-6D may be used, e.g., for pumping fluid at least partially through a downhole tool A (see FIGS. 1-2) disposed in a borehole penetrating a subsurface formation. Such pumping may include drawing fluid into the tool, discharging fluid from the tool, and/or moving fluid from one location to another location within the tool. The pumping assembly includes a displacement unit or pump 692 for displacing fluid, a first flow line 602 equipped with a pair of control valves CV1, CV4 for selectively communicating fluid to or from the pump 692, and a second flow line 604 equipped with a pair of control valves CV2, CV3 for selectively communicating fluid to or from the pump 692.

Each of the control valves is shown in greater detail in FIGS. 7A-7B. Thus, e.g., control valve CV4 includes a body 610 having a fluid passageway 612 therethrough and first and second openings 614, 616 each adapted for receiving or discharging fluid from the passageway 612. A piston 618 is slidably disposed in the passageway 612 between the first and second openings 614, 616 of the body 610. The piston 618 has a conduit portion 620 that defines a bore 622 therethrough for conducting fluid through a portion of the passageway 612. The bore 622 has a reduced flow area 624 across the length thereof.

A substantially cylindrical plug 626 is carried within the passageway 612 of the body 610. The plug 626 is equipped with one or more annular seals 628 each disposed in a complementing annular channel (not numbered) for sealably engaging the reduced flow area 624 of piston bore 622. The piston bore and the valve CV4 as a whole are closed upon translatory movement of the piston 618 relative to the plug 626.

The plug 626 is secured to the body 610 via a stem-like portion 611 thereof so as to remain stationary within the passageway 612. The plug 626 is equipped with a sleeve 625 that overlays or protects each annular seal 628 of the plug 626 when the piston bore 622 is open, as shown in FIG. 7B. The sleeve 625 is loaded or urged by a coil spring 627 to the protective position of FIG. 7B, substantially isolating each annular seal 628 from the erosive effects of the flowing fluid.

The valve body 610 has a central annular opening 632 defined by opposing side walls 634, 636 intermediate the first and second openings 614, 616. The piston 618 is equipped with an outer annular flanged portion 621 intermediate its ends. The flanged portion 621 is disposed within the central annular opening 632 of the body 610 so as to divide the central annular opening into first and second chambers 632a (see FIG. 7A) and 632b (see FIG. 7B). Accordingly, differential pressure across the chambers 632a,b, such as provided by pressurized hydraulic fluid in a known manner, induces reciprocal translatory movement of the piston 618 within the passageway 612 of the body 610.

The control valve CV4 further includes a coil spring 644 having a first end 644a secured to the body 610 and a second end 644b disposed in the first chamber 632a and urging the outer flanged portion 621 of the piston 618 to a stop position (see FIG. 7A) abutting the side wall 636 of the central annular opening 632 opposite the first chamber 632a. This stop position places the reduced flow area 624 defined by the piston bore 622 into engagement with an annular seal 628 of the plug 626 so as to close the bore 622. From this position, the piston 618 is constrained to movement towards the coil spring 644 when energized by pressure within the second chamber 632b that overcomes the bias of the first coil spring 644. Such movement shifts the piston 618 from the closed position of FIG. 7A to the open position of FIG. 7B (i.e., the piston bore 622 is open).

With reference again to FIGS. 6A-D, the assembly 600 employs four control valves, like valve CV4 described above, with a displacement unit (pump) 692 and a hydraulic pump 693 to control fluid flow. Hydraulic fluid is directed by the hydraulic pump 693 through solenoid valves SOL1 and SOL2, which form part of a control system CS for the assembly 600, controlling the operation of CV1-4. SOL3 and an associated poppet valve network is provided to reciprocate the central hydraulic piston 692p of displacement unit 692. As used herein, a poppet valve is a piloted operated check valve, and these terms may be used interchangeably herein.

SOL3 may be linked to SOL1 and SOL2 to synchronize timing therebetween. When the piston 692p reaches the end of its stroke, the solenoid valves change state, thus causing the hydraulic fluid to be delivered to one of chambers 632a, 632b (see FIGS. 7A-7B) for moving the pistons 618 to achieve the desired open/close positions. The control system CS further includes sensors S that detect the position of the piston 692p (or, alternatively, simply detect when the piston 692p reaches the end of its stroke), and system electronics (not shown) that automatically command the solenoid valves to selectively deliver hydraulic fluid via pump 693 to achieve the proper settings for the control valves CV1-CV4. Thus, the control system is operable to synchronize the operation of the pump 692 with the control valves, such that each control valve is commanded to open or close its bore at or near the time that the pump piston 692p completes each of its two strokes.

For example, in the "pump-up" settings of FIGS. 6A-B, fluid is moved to the right in flow line 654 by opening control valves CV1, CV3 in respective flow lines 602, 604 and closing control valves CV2, CV4 during the first stroke (piston 692p moves left in FIG. 6A). Such fluid movement is continued during the second stroke (piston 692p moves right in FIG. 6B) by opening control valves CV2, CV4 in respective flow lines 604, 602 while closing control valves CV1, CV3.

Similarly, in the "pump-down" settings of FIGS. 6C-D, fluid is moved to the left in flow line 654 by opening control valves CV2, CV4 in respective flow lines 604, 602 and closing control valves CV1, CV3 during the first stroke (piston 692p moves left in FIG. 6C). Such fluid movement is continued during the second stroke (piston 692p moves right in FIG. 6D) by opening control valves CV1, CV3 in respective flow lines 602, 604 while closing control valves CV2, CV4.

Aspects of one or more of the above-described embodiments include mud check valves for which the checking direction can be reversed by sliding a piston (e.g., 521) in the valve body. Another embodiment within the scope of the present disclosure, however, may employ actively actuated valves instead of mud check valves. For example, one approach entails using a synchronous type valve that uses hydraulic pressure to open and close the valve, which may include a metal-to-metal seal.

Also, in the embodiment described above and shown in FIGS. 6A-6D, the mud valves in the mud valve block are electrically/hydraulically actively actuated (non-checking valves). However, only a particular type of actively actuated valves is shown (having a plug for sealing a bore in the sliding piston). Various types of valves could be used to replace passive mud check valves with actively actuated valves within the scope of the present disclosure.

Moreover, in the synchronous valve system of FIGS. 6A-6D, the valves cannot be set to allow free flow through the tool. The standard passive check valves will allow flow in the pumping direction if the pressure across the tool is high enough to overcome the springs in the check valves, which may be about 100 psi. The synchronous valves will only direct fluid to and from the displacement unit. Two sets of valves are connected to each half of the displacement unit. On each set, one valve is connected to the input flow line and the other is connected to the output flow line. Only one of these two valves of each set is open at a time. The only way to move fluid through the displacement unit is to actively pump it.

In addition, as the displacement unit changes direction, one of the valves will need to open with full differential pressure across it, that is, a differential pressure corresponding to PDIFF=PBF−PF where PBH is the borehole pressure and PF is the formation pressure. in some situations, such as in highly depleted reservoirs, this pressure differential can reach values of 8000 psi.

The displacement unit described above also needs to be dead headed, or stuck at one end or the other, in order to build up the required pressure to operate the valves. Additionally, the solenoid valves are configured to open an active valve while closing another active valve, such that it may not be possible to simultaneously close all four active valves in a controlled manner.

In view of these concerns, the present disclosure also introduces a positive displacement unit having a cavity with a reciprocating piston defining two chambers, a first port in the first chamber connected to a mud valve block, and a second port in the second chamber connected to the mud valve block. First and second flow lines are connected to the mud valve block. The mud valve block controls the flow from the two chambers and the two flow lines. The mud valves in the mud valve block are actively actuated between open and closed positions. As such, these mud valves may be referred to hereafter as active mud valves, or simply active valves.

Such embodiments may provide the capability of closing all active valves before opening two of them (see, e.g., the hydraulically controlled sequencing described below). Such embodiments may also or alternatively provide the capability of having a free flow between the first and second flow lines, and/or stopping the flow between the first and second flow lines by using four independent solenoid valves to control the actives valves (see, e.g., the electrically controlled sequencing described below). Such embodiments may also or alternatively provide the capability of reversing the reciprocating direction of the piston at any time, without having the reciprocating piston abut internal ends of the displacement unit (see, e.g., the alternative implementations described below). Such embodiments may also or alternatively provide the capability of equalizing the pressure between the first and second chambers to minimize the pressure differential across an active valve to be opened (see, e.g., the sequencing using equalization described below).

Moreover, by implementing one or more aspects of these additional embodiments, the displacement unit can operate in both directions. Reversing the pumping direction in the middle of a stroke may be useful when flow line or valve plugging is suspected. If so, the pumping direction may be reversed to push contamination away, even in the middle of a stroke.

It is also worth noting that in the following discussion, the reciprocating piston is hydraulically actuated. However, the reciprocating piston may alternatively be mechanically actuated (see, e.g., U.S. Patent Application Publication No. 2008/0156486, the entirety of which is hereby incorporated by reference).

Figure 8A:
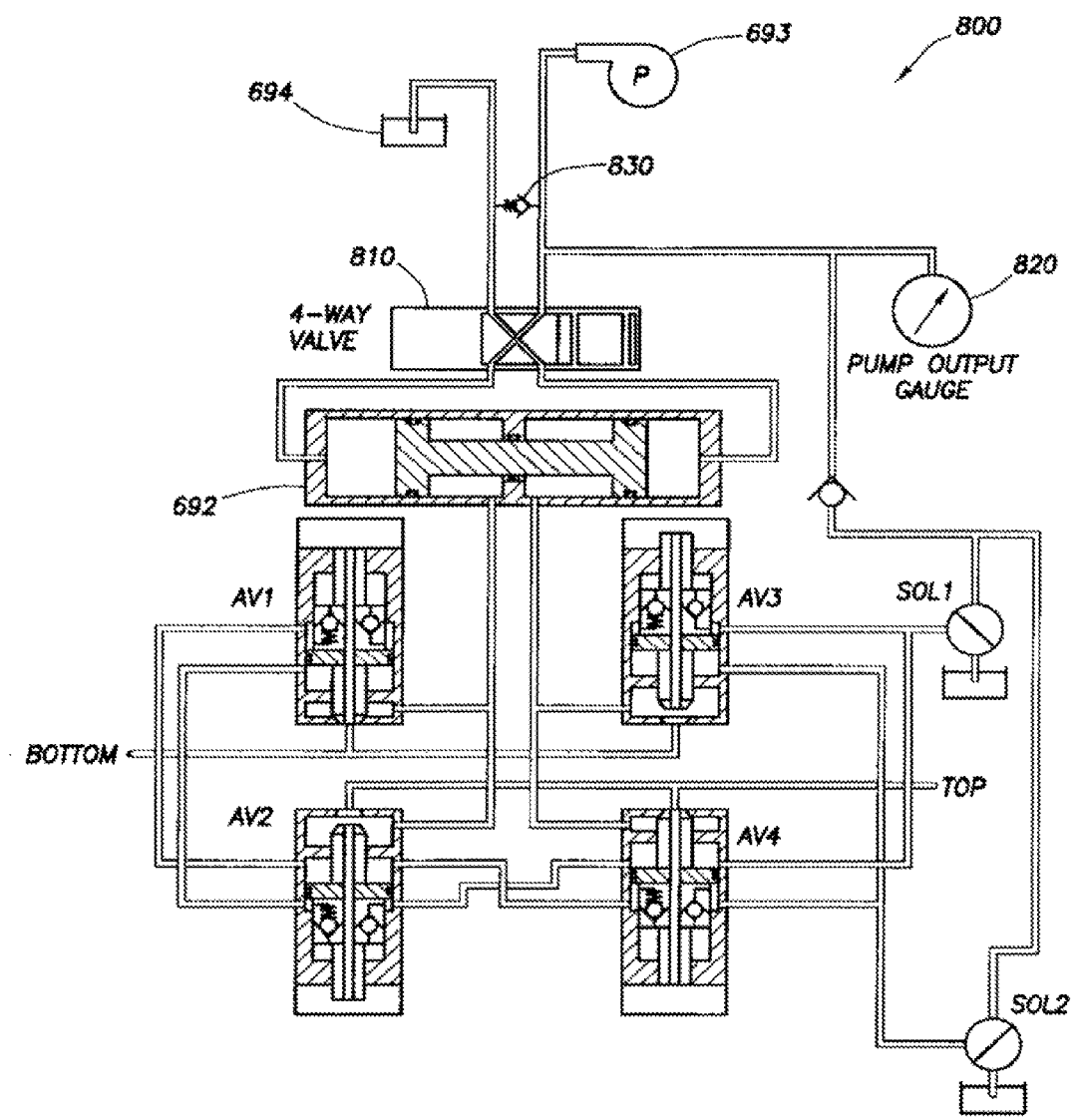
FIG. 8A is a schematic view of apparatus according to one or more aspects of the present disclosure.

Referring to FIG. 8A, shown is a schematic view of an apparatus 800 according to one or more aspects of the present disclosure. The apparatus 800 is or comprises a mud valve system for a positive displacement pump/unit, which may be substantially similar to those described above, with the following exceptions. For example, the apparatus 800 includes displacement unit 692 and hydraulic pump 693 as described above, but includes four active valves AV1, AV2, AV3 and AV4 instead of the four check valves CV1-CV4 described above.

The embodiment shown in FIG. 8A is configured for hydraulically controlled sequencing. Note that this embodiment permits successively closing all active valves (AV1-AV4) and then opening two active valves when reversing the reciprocating piston direction.

The active valves AV1-AV4 are active "On/Off" mud valves controlled by hydraulic pressure from solenoid valves SOL1 and SOL2. In one embodiment, solenoid valve SOL1 may be "normally open" and solenoid valve SOL2 may be "normally closed." However, other embodiments are also within the scope of the present disclosure. When opened, a solenoid valve supplies pressure to its associated active valves, while when closed, it relieves pressure to a hydraulic oil reservoir. Displacement unit 692 is controlled by a four-way valve 810. The four-way valve has a first port fluidly connected to the hydraulic pump 693, a second port fluidly connected to a hydraulic reservoir 694, a third port fluidly connected to a chamber of the displacement unit 692, and a fourth port fluidly connected to another chamber of the displacement unit 692. The hydraulic reservoir 694 may be a common hydraulic reservoir to which other components of the apparatus 800 may be fluidly connected. The suction of the hydraulic pump 693 may also be fluidly connected (not shown) to the hydraulic reservoir 694.

FIGS. 8B and 8C are example embodiments of the active valves AV1-AV4 shown in FIG. 8A. FIG. 8B shows the status of the active valves AV1 and AV4 in the configuration of FIG. 8A, and FIG. 8C shows the status of the active valves AV2 and AV3 in the configuration of FIG. 8A. However, the valves shown in FIGS. 8B and 8C are identical.

Referring to FIGS. 8A-C, collectively, active valves AV1-AV4 each contain a check valve 802 and a relief valve 804. The relief valve setting may be about 3500 psi, or some other setting between a pumping pressure of the displacement unit 692 and a maximum output pressure of the hydraulic pump 693. However, the relief valve 804 only needs to have a high enough rating to support the force applied by the output pressure on the end of the slider 806. This requirement is to keep the valve closed when the hydraulic pressure is at reservoir pressure on both sides of the slider 806. The minimum pressure rating is the pressure required to move the sliders 806 of two active valves at the same time. This is to keep the two closed valves closed while the two open valves are closing. Thus, the relief valve setting at a value of 3500 psi is only a typical value, and others may be used within the scope of the present disclosure.

The purpose of these valves is for sequencing. The active valves will close with only minimal pressure applied to the close port 808. To open, sufficient pressure must be applied to the open port 809 to overcome the 3500 psi relief. About 3000 psi is required for opening, since there is a built in pressure amplification. Each active valve AV1-AV4 also includes a port 801a fluidly connected to the displacement unit 692 and a port 801b fluidly connected to flow lines of the downhole tool comprising the apparatus 800.

For pumping UP, with the displacement unit 692 moving to the right, active valves AV2 and AV3 are open, and active valves AV1 and AV4 are closed. This means SOL2 is open and SOL1 is closed. While the displacement unit 692 is moving, there will be a variable pressure P1 on the pump output gage 820, where P1 is determined by the formation pressure, hydrostatic pressure, etc.

When the displacement unit 692 nears the end of its stroke, active valves AV2 and AV3 are closed, and then active valves AV1 and AV4 are opened. For example, by detecting the position of the displacement unit 692 before it reaches the absolute end, active valves AV2 and AV3 can be closed by switching solenoid valves SOL1 and SOL2. When active valves AV2 and AV3 have closed, provided the output pressure is high enough to generate the force required to move their sliders, the pressure will shoot up on the pump output gage 820, regardless of whether the displacement unit 692 reaches the end of it stroke. When the pressure rises sufficiently, active valves AV1 and AV4 will begin to open.

If the four-way valve 810 is not switched yet, pumping direction will be reversed for a short period until the piston of the displacement unit 692 reaches the end of the stroke (this is not desirable). If the four-way valve 810 is switched before active valves AV1 and AV4 open, then the piston of the displacement unit 692 will not ever hit the end of its stroke. In that case, active valves AV1 and AV4 will likely not open completely (unless the pumping pressure is quite high) and will be throttling the pumping flow through the entire stroke (also not desirable). Ideally, the solenoid valves SOL1 and SOL2 should be switched open just before the piston of the displacement unit 692 reaches the end of the stroke so that its end is reached exactly when active valves AV2 and AV3 completely close. Then, after sufficient pressure is recorded on the pressure gage 820 to ensure that active valves AV1 and AV4 are completely open, the four-way valve 810 is switched.

In a related embodiment, the solenoid valves SOL1 and SOL2 may be switched after the displacement unit 692 reaches the end of its stroke. Then, the four-way valve 810 may be switched after the pressure gage 820 shows a sufficiently high value (e.g., about 3400 psi, among other possible values).

With regard to thermal pressure relief in this hydraulically sequenced scheme, each side of each active valve is connected to either a reservoir or the output of the pump 693. Thus, the side connected to the reservoir is at hydrostatic pressure, and the other side connected to the output of the pump 693 is protected by a relief valve 830 at the output of the pump 693. The isolated cavity of each active valve is protected by the relief valve connecting it to the opening side of the valve. Thus, all of the active valves are protected against thermal expansion.

As described above, a limitation of other embodiments is that the displacement unit 692 needs to be dead headed in order to build up the required pressure to operate the check valves. However, the present embodiment may at least partially minimize this requirement.

Figure 9:
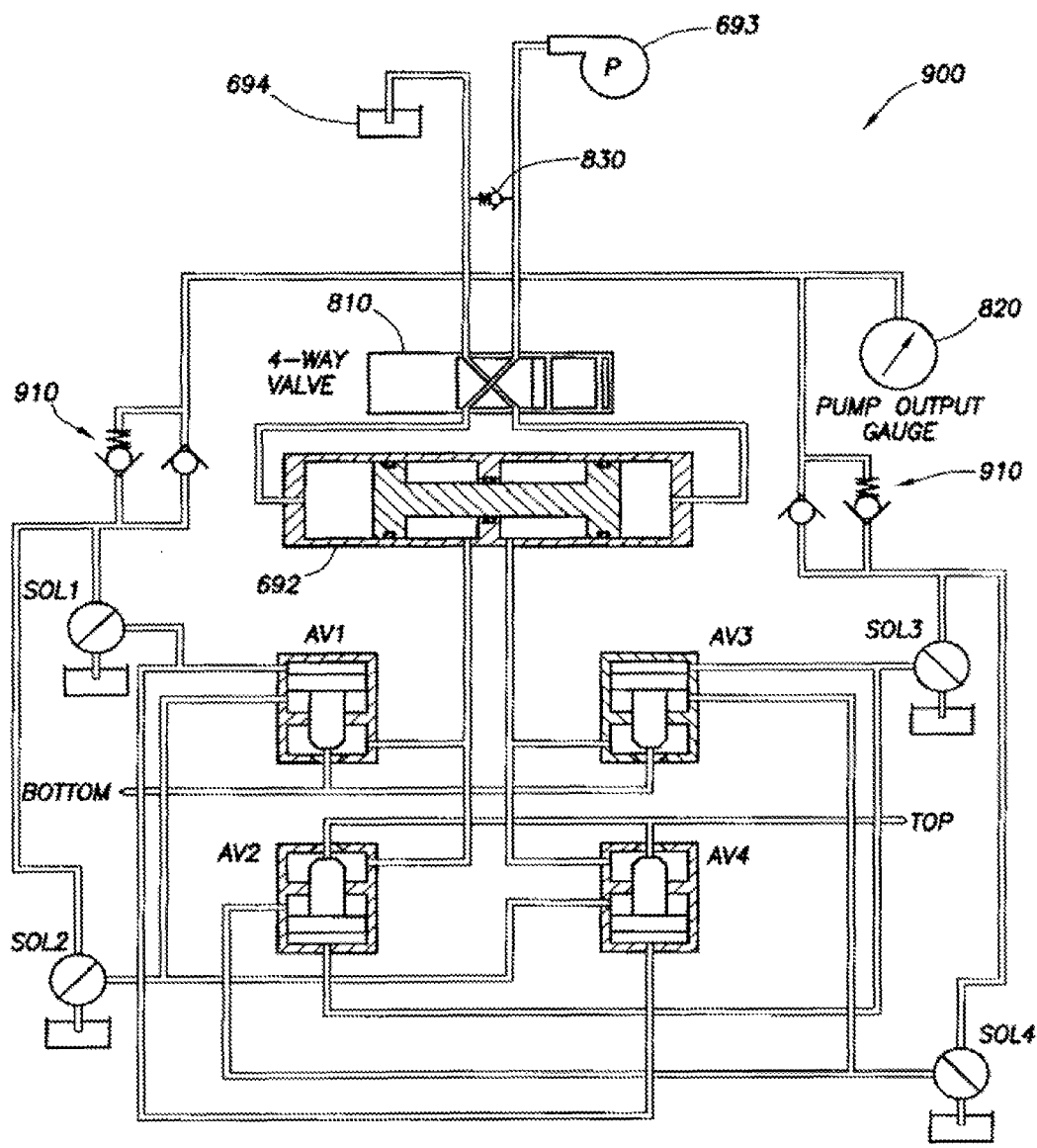
FIG. 9 is a schematic view of apparatus according to one or more aspects of the present disclosure.

Referring to FIG. 9, shown is a schematic view of an apparatus 900 according to one or more aspects of the present disclosure. The apparatus 900 is or comprises a mud valve system for a positive displacement pump/unit, which may be substantially similar to those described above, with the following exceptions. For example, the apparatus 800 includes displacement unit 692 and hydraulic pump 693 as described above, and also includes four active valves AV1, AV2, AV3 and AV4 as described above and shown in FIG. 8A.

However, the embodiment shown in FIG. 9 is configured for electrically controlled sequencing. Note that this embodiment, by using four independent solenoid valves SOL1, SOL2, SOL3 and SOL4 to control the actives valves AV1-AV4, also permits successively closing all active valves and then opening two active valves when reversing the reciprocating piston direction. In addition, this embodiment permits a free flow across the displacement unit 692.

Active valves AV1-AV4 are active "On/Off" mud valves, controlled by hydraulic pressure from solenoid valves SOL1-SOL4. Solenoid valves SOL1 and SOL4 may be "normally closed" and solenoid valves SOL2 and SOL3 may be "normally open." However, other arrangements are also within the scope of the present disclosure. The displacement unit 692 is controlled by the four-way valve 810.

Figure 10:
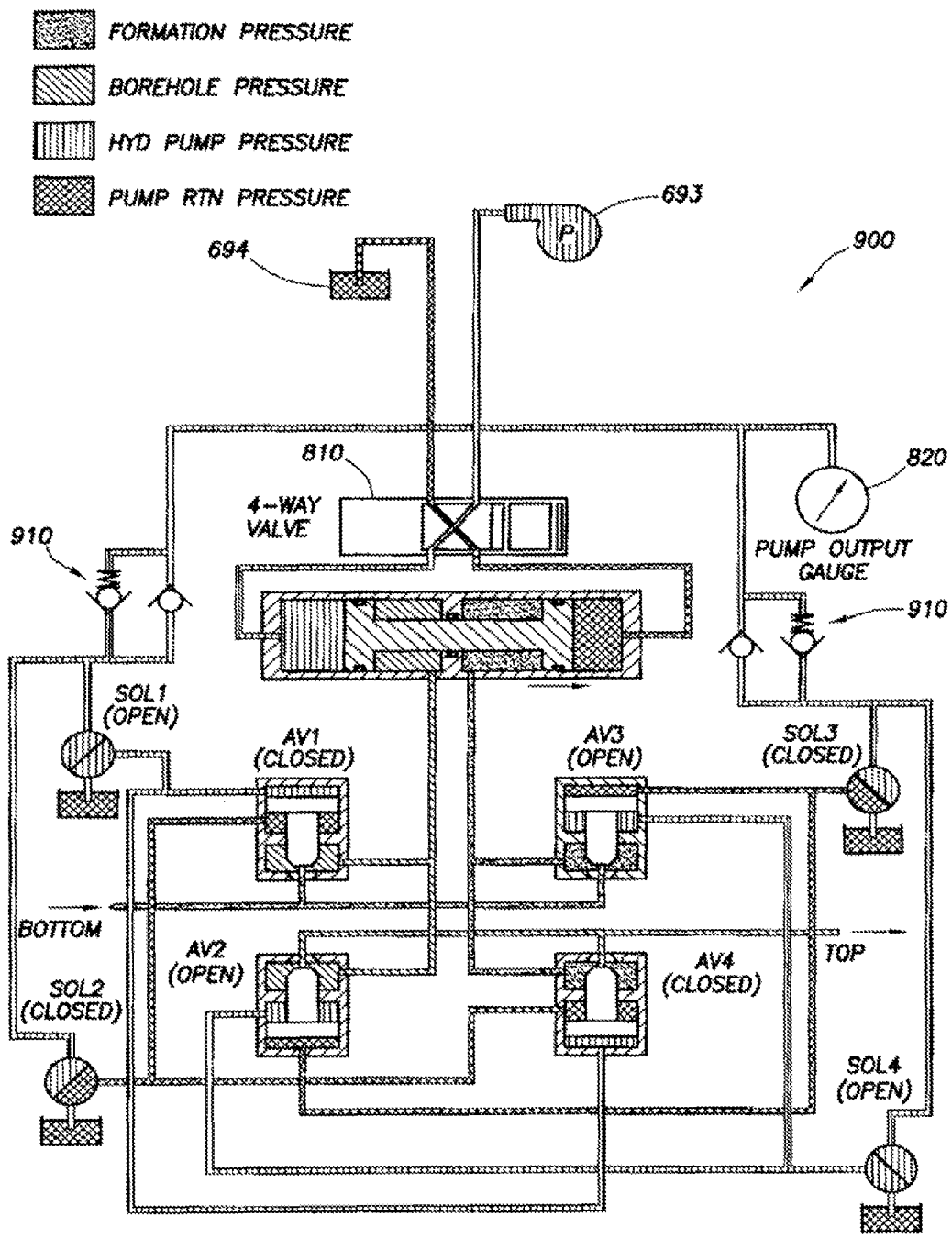
FIGS. 10 and 11 are schematic views of the apparatus shown in FIG. 9.

Referring to FIG. 10, illustrated is a schematic view of the apparatus 900 shown in FIG. 9 and configured for pumping UP, with the displacement unit 692 moving to the right. Active valves AV2 and AV3 are open, and active valves AV1 and AV4 are closed. Thus, solenoid valves SOL1 and SOL4 are open, and solenoid valves SOL2 and SOL3 are closed. While the displacement unit 692 is moving, there will be a variable pressure P1 on the pump output gage 820, where P1 is determined by the formation pressure, hydrostatic pressure, etc.

Figure 11:
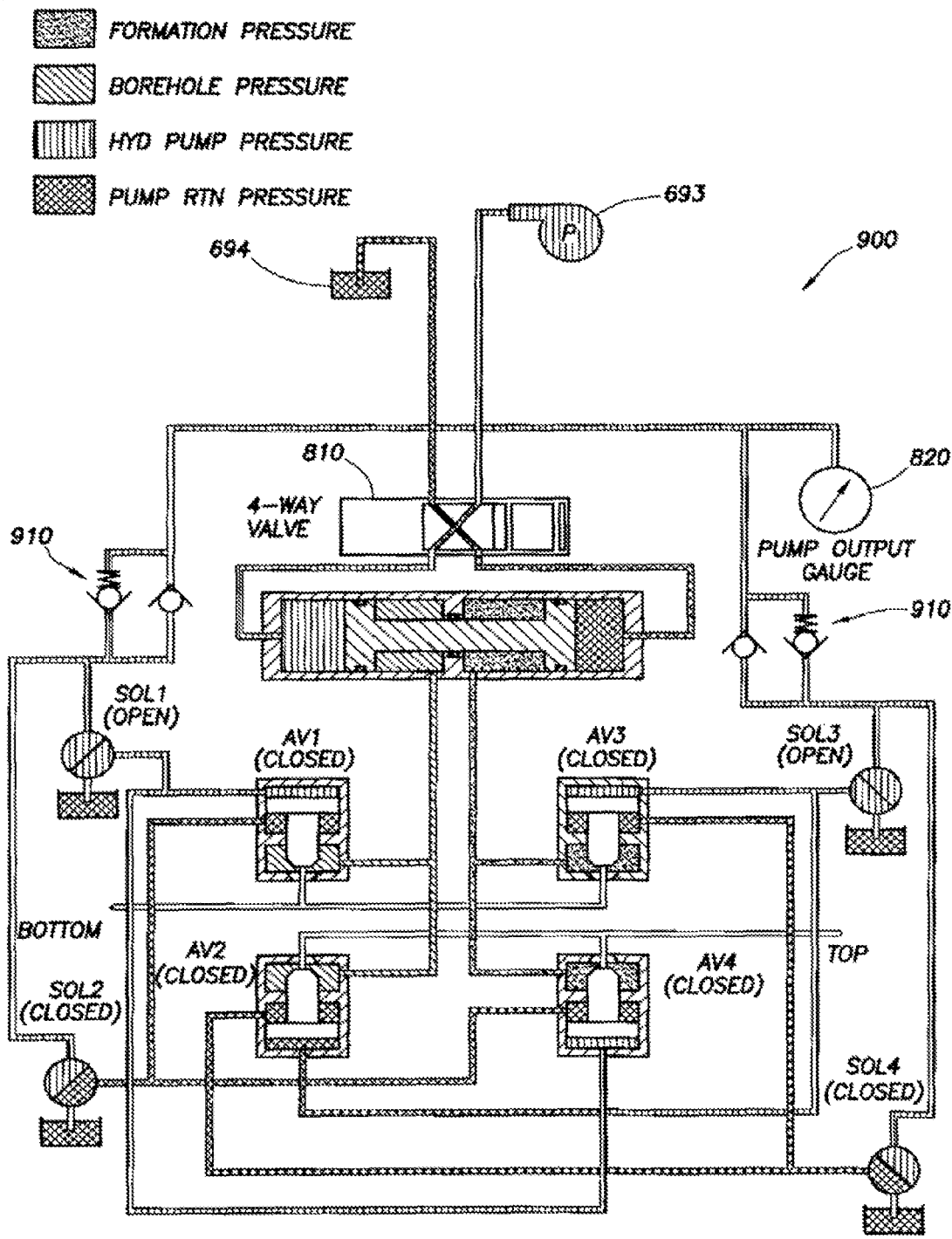

When the displacement unit 692 gets close to the end of its stroke, or otherwise when desired, active valves AV2 and AV3 are first closed. Then, the hydraulic pressure is allowed to come up to a nominal pressure P2, at which time active valves AV1 and AV4 are opened, using the nominal pressure P2. For example, the position of the piston of the displacement unit 692 may be detected, and before it reaches the absolute end, active valves AV2 and AV3 may be closed by switching solenoid valves SOL3 and SOL4. As shown in FIG. 11, when active valves AV2 and AV3 have closed (if the output pressure is high enough to generate the force required to move the sliders on the valves that are closing and/or if the trapped pressure between the valves AV2 and AV3 and a check valve relief valve assembly 910 is sufficient), the pressure shown on the pressure gage 820 will rapidly increase, regardless of whether the displacement unit 692 reaches the end of its stroke. When the pressure rise is seen on the gage 820 to reach level P2, then active valves AV1 and AV4 can be opened by switching SOL1 and SOL2, and the four-way valve 810 may be switched, all at the same time. The pressure required to open the valve would be more than that required to close it, since the area on the open side of the valve is smaller than the closed side. There will be a high pressure after active valves AV2 and AV3 close by building full pressure before switching the direction of the displacement unit 692. Thus, there will be an initial force to open active valves AV1 and AV4 and to make sure active valves AV1 and AV4 are fully open.

Note that if the differential mud pressure is quite low, then active valves AV2 and AV3 may not close even though the solenoid valves SOL3 and SOL4 are switched, due to seal friction, etc. However, when the displacement unit 692 reaches the end of its stroke, pressure will rise and the active valves AV2 and AV3 will close. This may cause more of a spike in the flow rate, but the very low differential scenario will probably not occur too often.

As for thermal pressure relief, the solenoid valves may be self protecting (e.g., act as a relief valve) when one is in the "off" position. Since they are operated in pairs (SOL3 and SOL4 operate together, and SOL1 and SOL2 operate together), one of each pair will usually be off when the other is on, and will thus act as a relief for the circuit.

Figure 12:
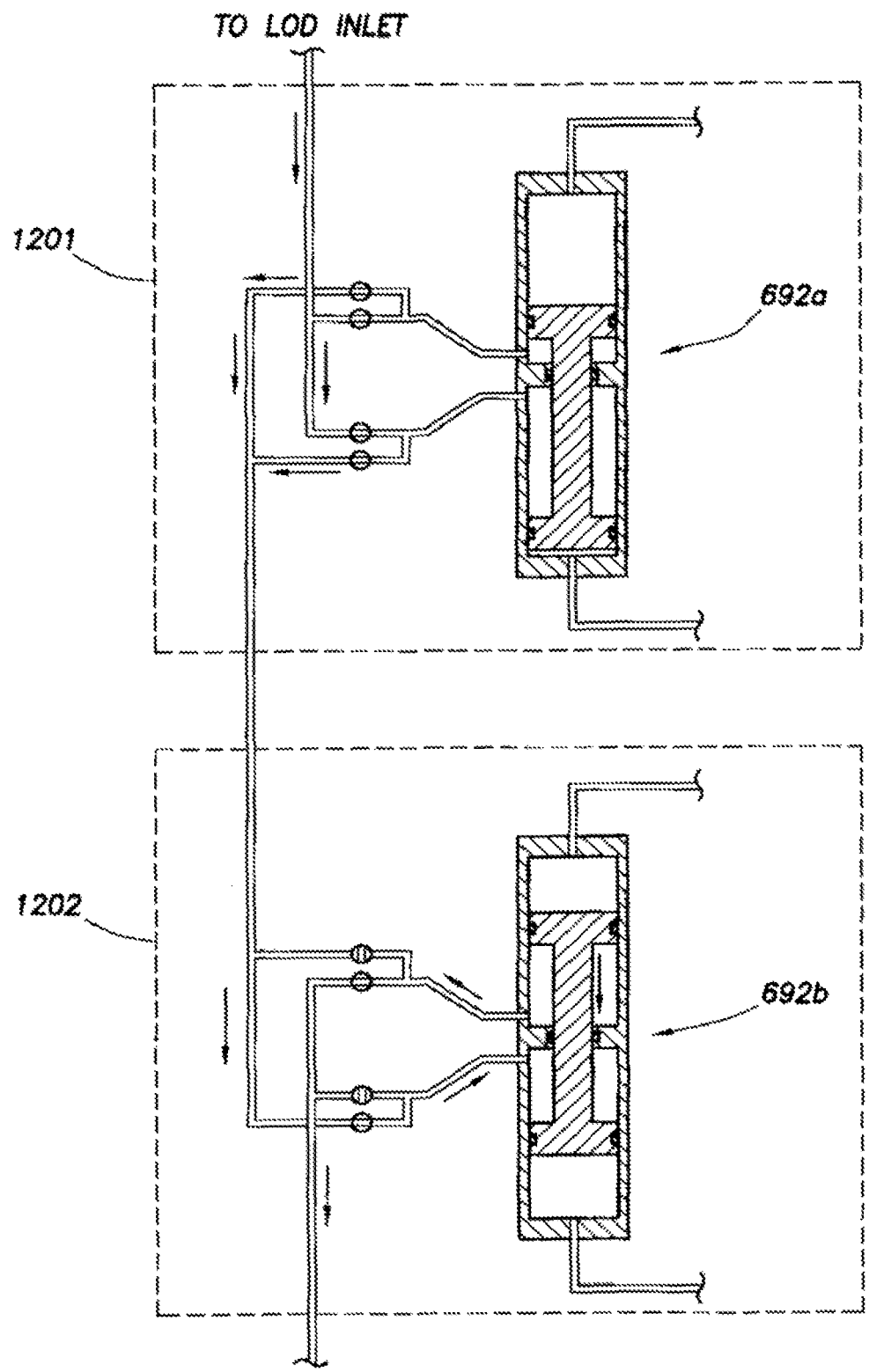
FIG. 12 is a schematic view of apparatus according to one or more aspects of the present disclosure.

As mentioned before, the proposed system allows switching solenoid valves SOL1 and SOL3 to their closed position (connected to the hydraulic oil reservoir), and switching solenoid valves SOL2 and SOL4 to their open position (connected to the output of pump 693). In this configuration, all active valves AV1-AV4 will open provided enough hydraulic pressure is available (the piston may have to reach the end of stroke position). In particular, active valves AV1 and AV2, connected to the same chamber of the displacement unit, permit free flow between the top and bottom flow lines. In such manner, the displacement unit 692 maybe bypassed so that the fluid goes "through" the tool. This may be particularly helpful when two pump modules are used in series, as shown in FIG. 12, such that the displacement unit 692a of one pump module 1201 is short circuited as the displacement unit 692b of the second pump module 1202 is used.

The embodiments shown in FIGS. 8-11 use active "On/Off" mud valves (for example, hydraulically actuated). This solution offers technical advantage over passive spring-loaded mud check valves. For example, it may allow better opening and therefore less pressure drop, as well as reduced probability to induce phase separation across the valve and accumulation of formation gas in the pump. It may also enable less silting. Silting can lead to issues such as plugging and/or erosion. Active valves may also provide more force to crush particle contaminant flowing in the valve, and better chances to get a good seal when the valve is in a closed configuration.

Figure 13:
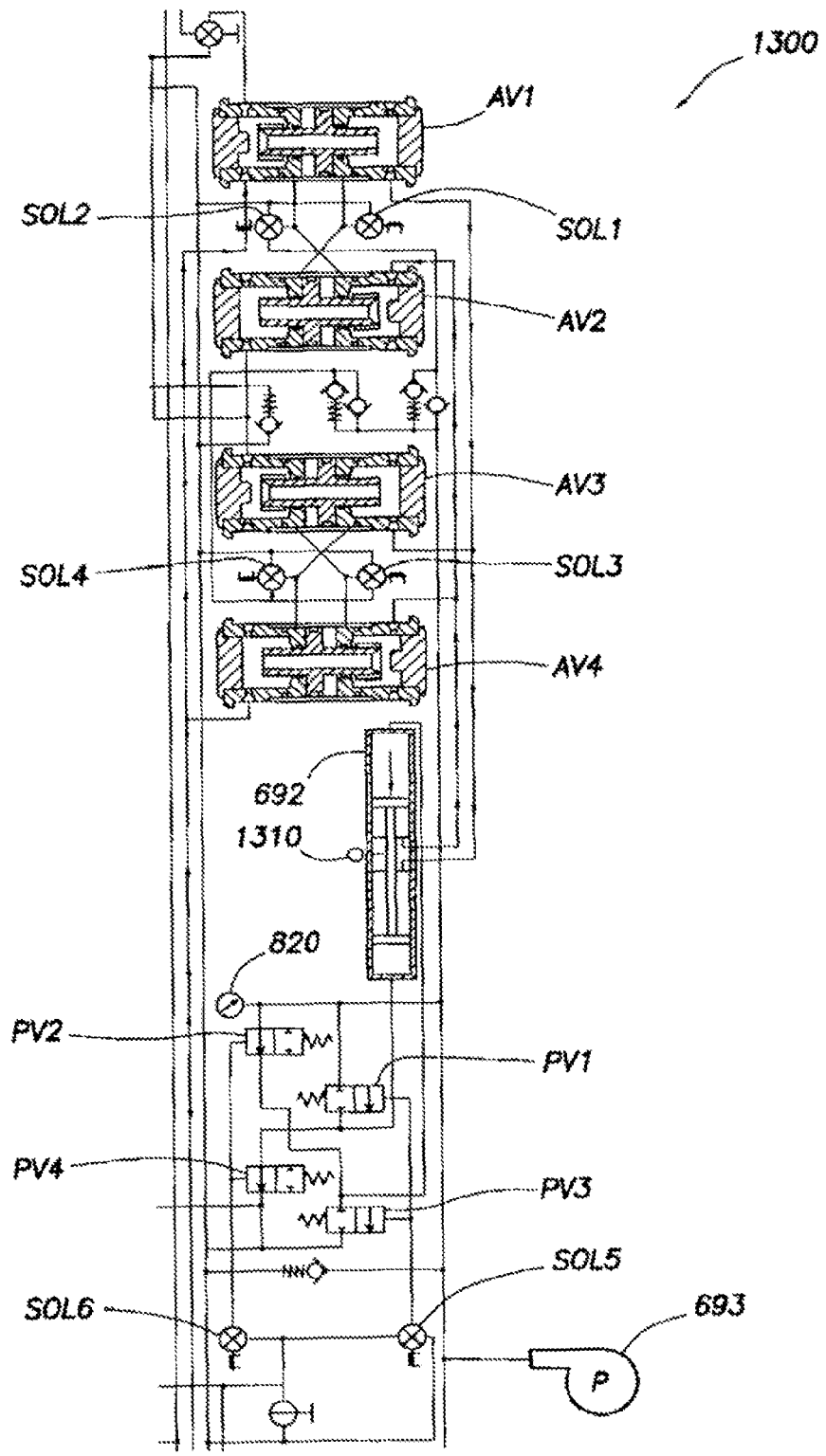
FIG. 13 is a schematic view of apparatus according to one or more aspects of the present disclosure.

Referring to FIG. 13, shown is a schematic view of an apparatus 1300 according to one or more aspects of the present disclosure. The apparatus 1300 is or comprises a mud valve system for a positive displacement pump/unit, which may be substantially similar to those described above, with the following exceptions. For example, the apparatus 1300 includes displacement unit 692, hydraulic pump 693, active valves AV1-AV4, and solenoid valves SOL1-SOL4.

In this implementation, the flow of hydraulic oil may be selectively routed to the active valves for facilitating their closing. This may provide the capability of reversing the reciprocating direction of the piston of the displacement unit 692 at any time, without requiring abutment of the reciprocating piston.

Moreover, in this embodiment, the four-way/two-position valves are replaced by two additional solenoid valves SOL5 and SOL6 driving four poppet valves PV1, PV2, PV3 and PV4. An additional hydraulic power source may be provided by a buffer which provides hydraulic flow to open the normally closed poppet valves PCV1-PCV4 even if the pump 693 is not actuated.

Figure 14:
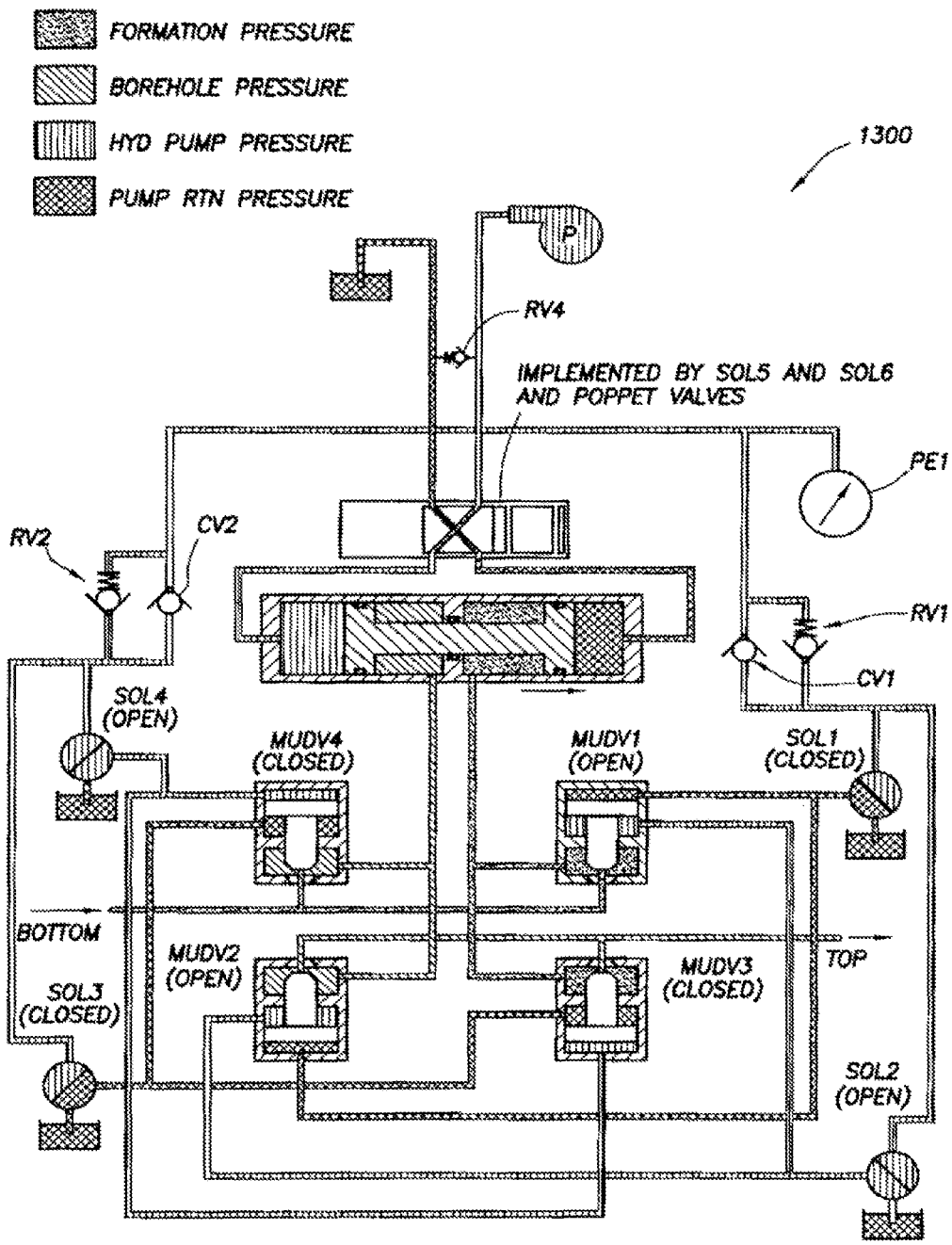
FIGS. 14-18 are schematic views of the apparatus shown in FIG. 13.

Referring to FIG. 14, illustrated is a schematic view of the apparatus 1300 shown in FIG. 13 and configured for a switching sequence, where some details have been omitted for clarity. For example, a hydraulic switch between the hydraulic reservoir/pump 693 and the displacement unit 692 is implemented here by the solenoid valves SOL5 and SOL6 driving the poppet valves PV1-PV4, not shown in detail.

A reversing sequence may start with the piston of the displacement unit 692 moving from left to right, the fluid being pumped from the "bottom" flow line (connected to a probe or a packer) to the "top" flow line. Thus, active valves AV3 and AV4 are closed, and active valves AV1 and AV2 are open. Solenoid valve SOL6 transmits hydraulic pressure to poppet valves PV2 and PV4 to open them. Solenoid valve SOL5 is routed to the hydraulic reservoir so that poppet valves PV1 and PV3 are in their normally closed position.

When desired, the piston direction can be reversed. The sequence starts by returning the poppet valves PV2 and PV4 to their normally closed position by switching solenoid valve SOL6, as an optional step. This stops the flow to the displacement unit 692, even if the pumped fluid is compressible (gas) and/or the pumping rate of the pump 693 is low. This may facilitate the building of pressure at the output of the pump 693, for example, up to the level of the cracking pressure of a relief valve RV4 (e.g., 3700 psi) coupled between the pump 693 and the hydraulic reservoir. Also in this configuration, it is possible to check the operability of the motor driving the hydraulic pump 693. Because the hydraulic pressure is not communicated to the displacement unit 692, it is possible to build up pressure in the hydraulic circuit and draw maximum current of the motor while avoiding the use of a flow restrictor. This is illustrated by FIG. 15.

Figure 15:
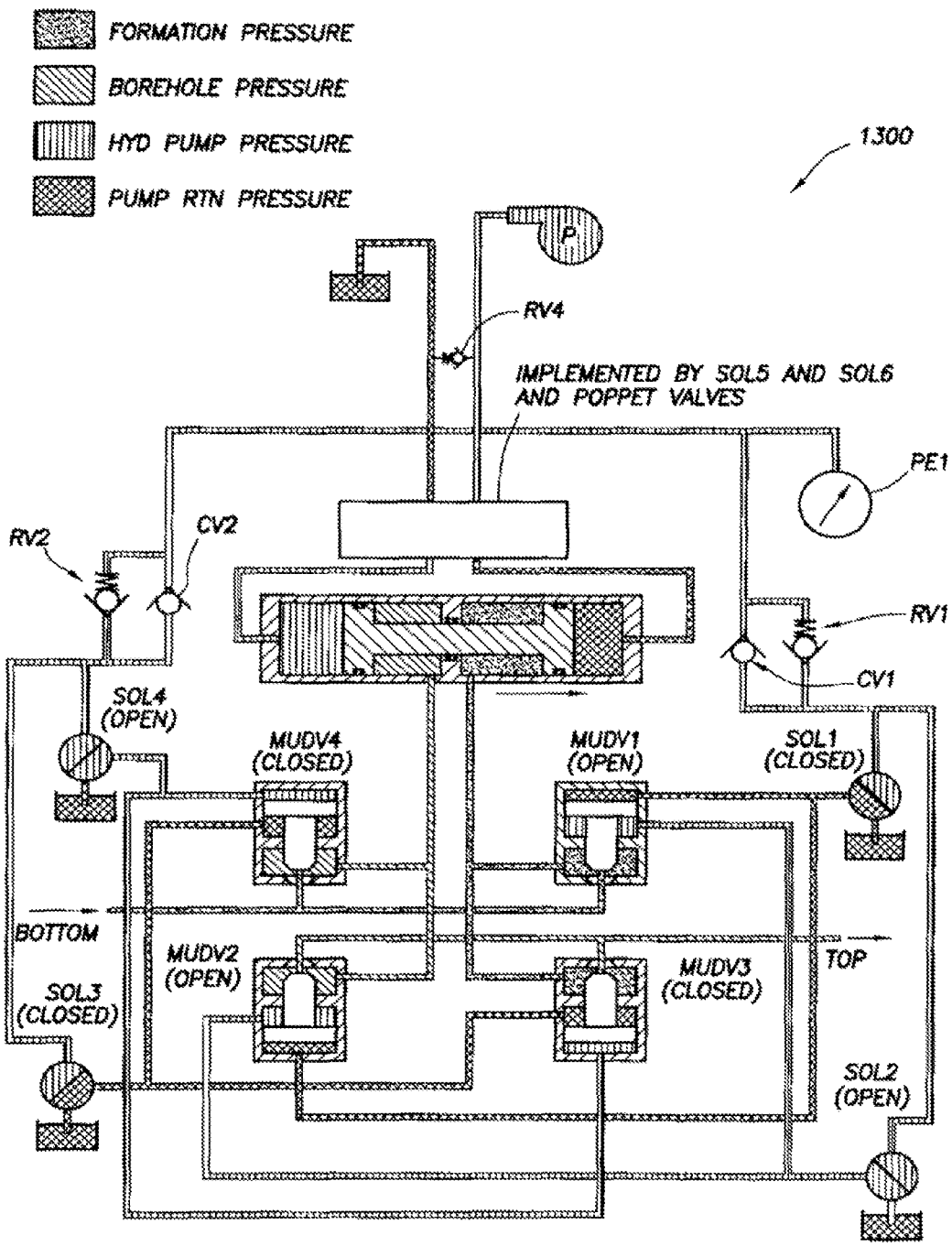

As best shown in FIG. 15, having both solenoid valves SOL5 and SOL6 open to return will short the displacement unit 692 from the hydraulic pump 693. No hydraulic fluid will flow to and from the displacement unit 692.

Also, having both solenoid valves SOL1 and SOL4 closed to return and solenoid valves SOL2 and SOL3 open to return will close all the active valves AV1-AV4. This isolates the flowline from the displacement unit 692.

Furthermore, having solenoid valves SOL1 and SOL4 closed to return and solenoid valves SOL2, SOL3, SOL5 and SOL6 open to return will charge up the system. That is, the pump 693 will build up pressure up to the cracking pressure of the relief valve RV4 (e.g., 3400-3700 psi). This may also allow an accumulator (not shown) to be charged up. The accumulator may be configured help move the poppet valves PV1-PV4 as the hydraulic pump 693 is used to move the active valves AV1-AV4.

Additionally, active valves AV1 and AV2 are connected to the hydraulic pump 693 through check valve CV1, and active valves AV3 and AV4 are connected to the hydraulic pump 693 through check valve CV2. Both of these check valves CV1 and CV2 may be configured to crack at about 3500 psi (among other values within the scope of the present disclosure). For the active valves to move, the system may charge up to about 80 psi assuming both solenoid valves SOL5 and SOL6 are open to return. Also, the hydraulic piston area on each active valve is much larger than the seal area on the mud side of the valve. Thus, it will take little hydraulic pressure to move the active valve relative to the mud pressure. The cracking pressure of CV1 and CV2 may be optimized or otherwise configured to ensure active valve movement with little hydraulic pump pressure generated by the pump 693. Also, since active valves AV1 and AV2 are connected to the hydraulic pump 693 through check valve CV1 and active valves AV3 and AV4 are connected to the hydraulic pump 693 through check valve CV2 independently, the switching of the direction of the displacement unit 692 should not substantially effect the switching ability of the active valves.

The apparatus 1300 also comprises relief valves RV1 and RV2 next to the check valves CV1 and CV2. The relief valves RV1 and RV2 may be configured to crack around 3500 psi, and allow pressure storage up to this amount to the check valves CV1 and CV2 and active valves AV1-AV4. This stored energy may also help move the active valves AV1-AV4.

Figure 16:
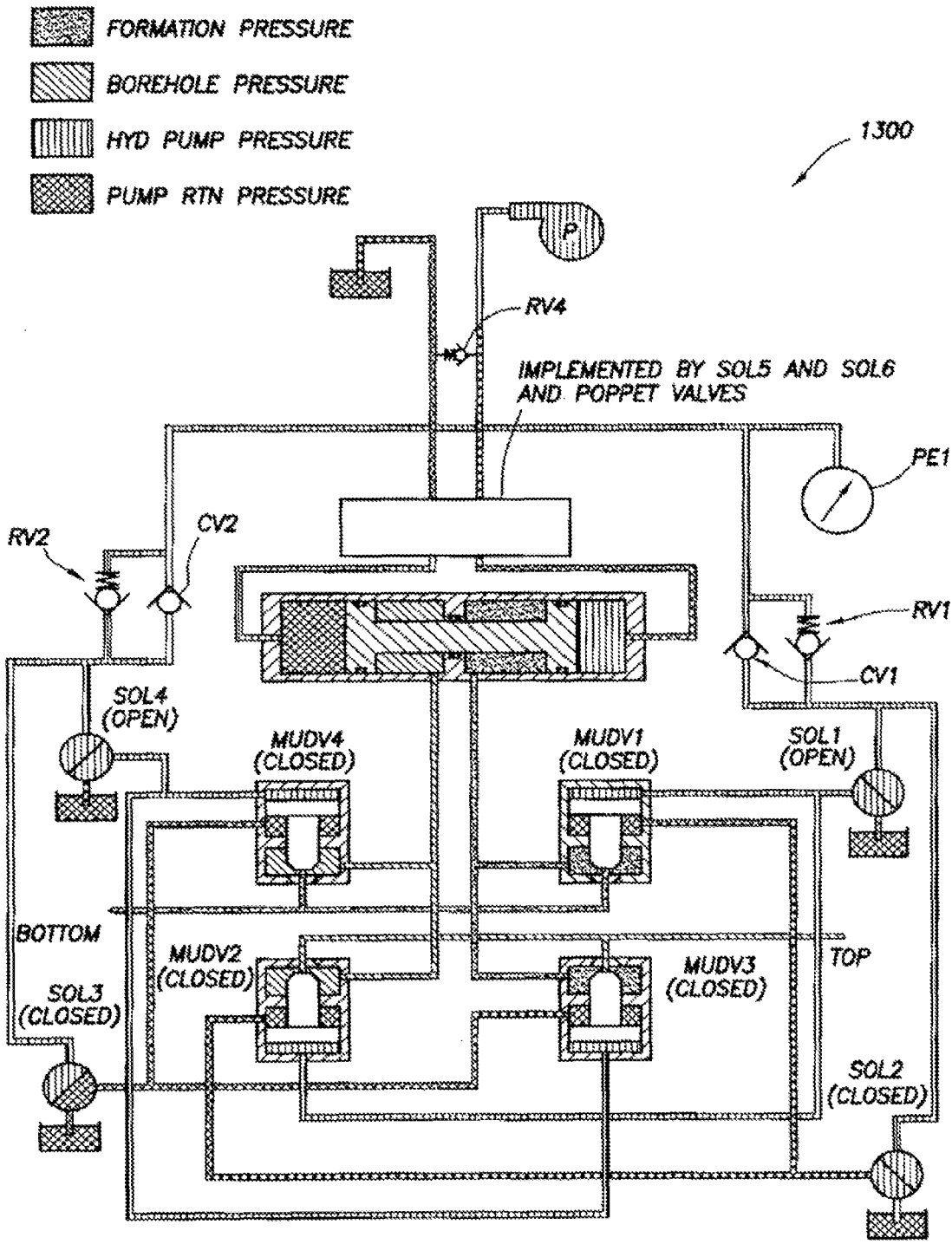

The sequence may then continue by closing valves AV1 and AV2 by switching solenoid valves SOL1 and SOL2. This is operation may occur even if the reciprocating piston has not reached the end of its stroke, as the hydraulic pump 693 has been able to build up pressure in the previous step. The flow in the flow lines "bottom" and "top" is thereby stopped, as shown in FIG. 16. The closure of the valve is facilitated by the high pressure generated by the pump 693 at the previous step. Also, the closure is facilitated by trapping pressure between AV1 and AV2 and the check valve CV1. If desired, an accumulator (not shown) may be added in this portion of the hydraulic circuit.

Figure 17:
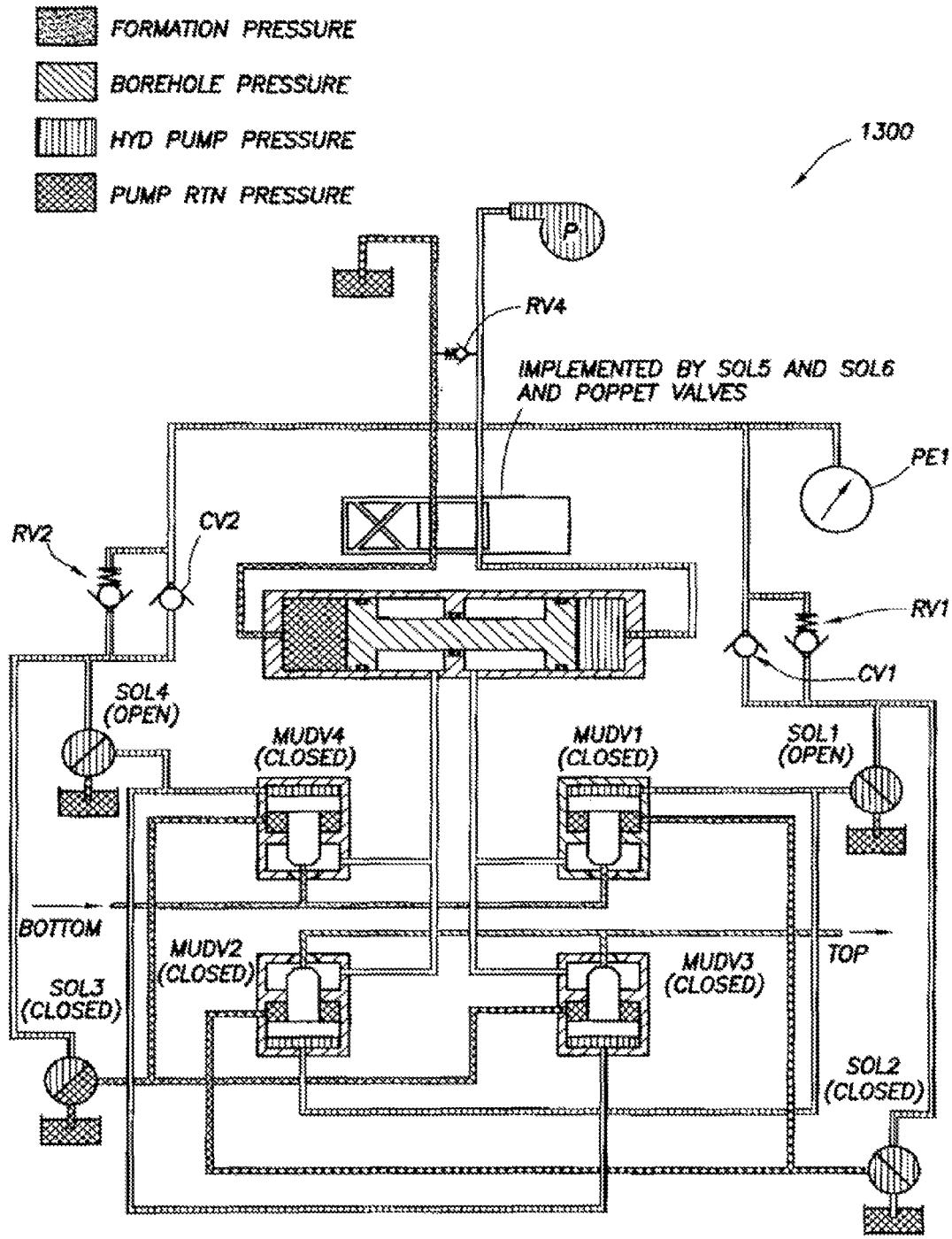

When all of the active valves AV1-AV4 are closed, the reciprocation direction of the reciprocating piston may be switched. As described above, it may be important to have all of the active valves AV1-AV4 closed before the displacement unit 692 switches direction. For example, this may help prevent shocking the formation with hydrostatic pressure. Solenoid valve SOL5 can be switched, and this will send hydraulic pump pressure to the right side of the displacement unit 692, as shown in FIG. 17.

Figure 18:
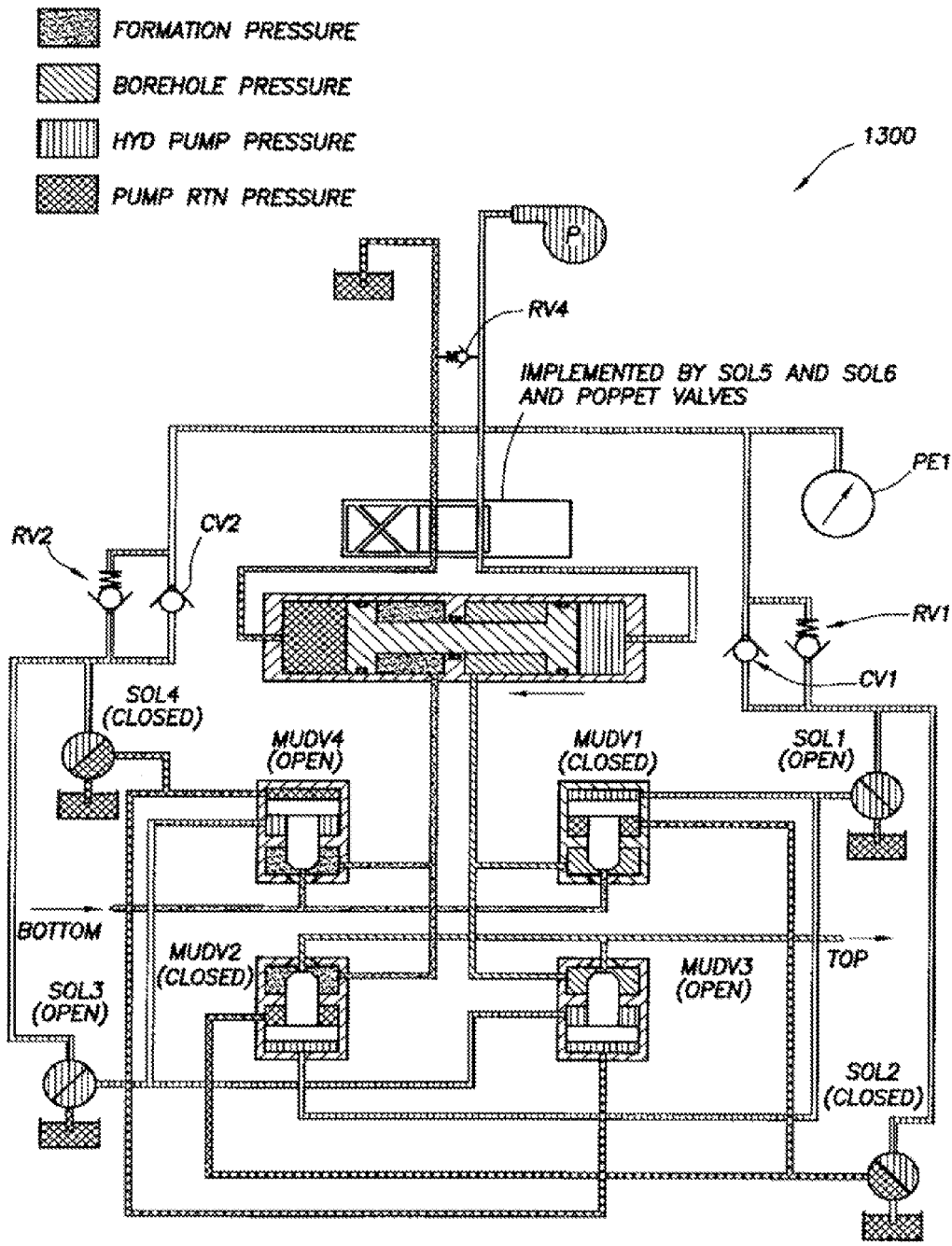

When sufficient pumping has occurred as to reduce the pressure in the left side of the displacement unit 692 at or below the flow line pressure, then AV1 and AV3 may be opened. In particular, after hydraulic pump pressure is sent to the right side of the displacement unit 692, active valves AV1 and AV2 are left closed, and active valves AV3 and AV4 are opened by switching solenoid valves SOL3 and SOL4, as shown in FIG. 18. The opening of the active valves AV3 and AV4 may be facilitated by the pressure trapped between the check valve CV1 and the active valves AV3 and AV4. The reciprocating piston would then move to the left. Pumping then continues.

In this embodiment, it may alternatively be necessary to equalize the pressure in the displacement unit 692 before opening active valves AV3 and AV4, such as may be required to not shock the formation. However, both solenoid valves SOL5 and SOL6 need to be off, thus shutting off the hydraulic pressure to the displacement unit 692, when opening active valves AV3 and AV4 (see FIG. 16). This may insure the valves get full hydraulic pressure to make sure they open fully. The sequence may be to first activate solenoid valve SOL5 momentarily, then deactivate, which will equalize the pressure on the displacement unit 692. Next, solenoid valves SOL3 and SOL4 are opened to open check valves CV3 and CV4. Next, after pump pressure reaches the maximum, solenoid valve SOL5 is activated to start the displacement unit 692 moving to continue pumping.

Figure 19:
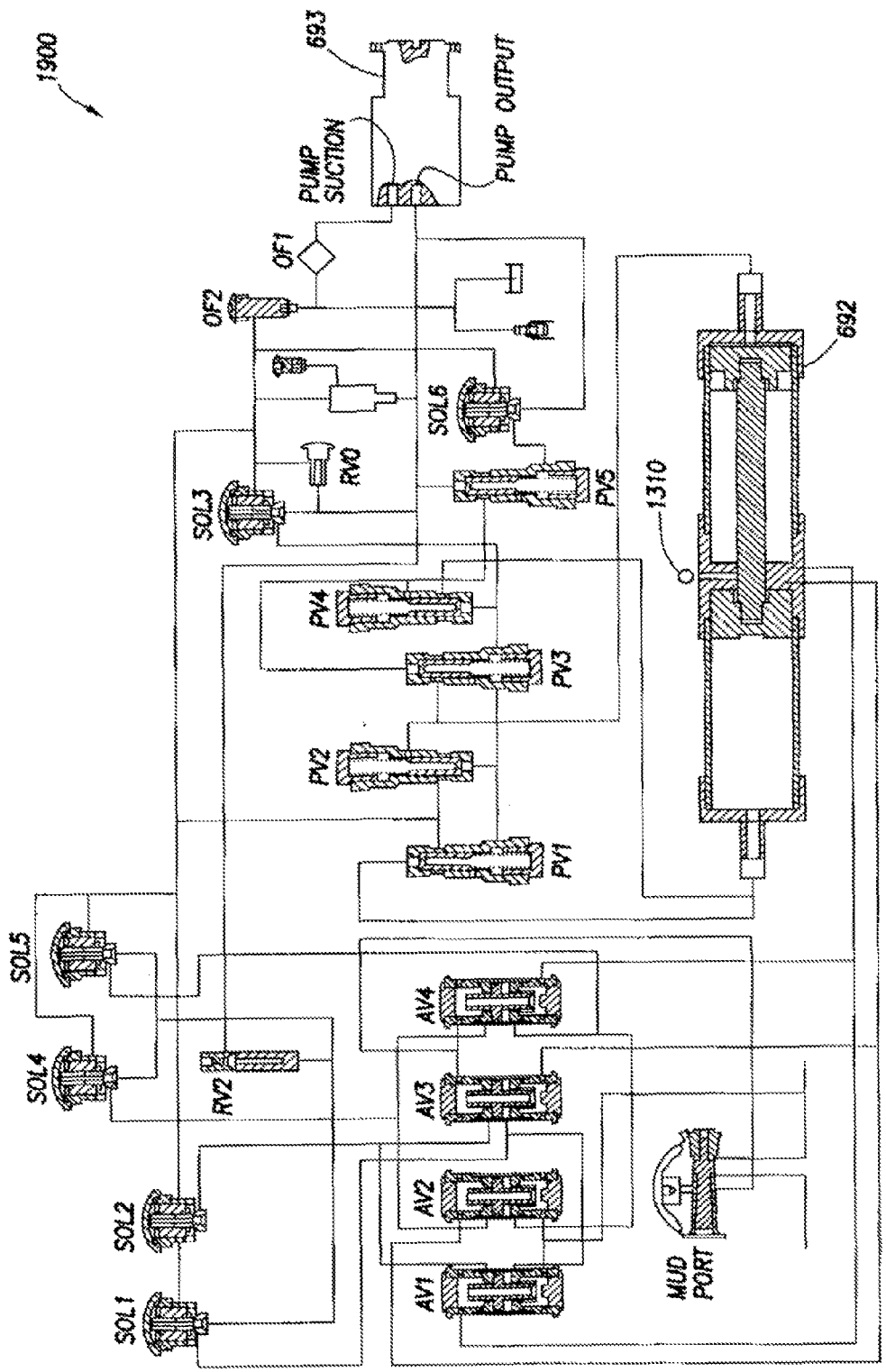
FIG. 19 is a schematic view of apparatus according to one or more aspects of the present disclosure.

Referring to FIG. 19, shown is a schematic view of an apparatus 1900 according to one or more aspects of the present disclosure. The apparatus 1900 is or comprises a mud valve system for a positive displacement pump/unit, which may be substantially similar to those described above, with the following exceptions. For example, the apparatus 1900 includes displacement unit 692, hydraulic pump 693, active valves AV1-AV4, solenoid valves SOL1-SOL6, and poppet valves PV1-PV4.

The active valves AV1-AV4, as shown in FIG. 19, are closed when the slider is up, and open when the slider is down.

The travel of the slider in each valve may be only about 0.1", so the time to open or close the valves may be very short.

When pumping, active valves AV1 and AV3 may operate together, and active valves AV2 and AV4 may operate together. As described above, conventional arrangements require the active valves to all operate together. Thus, in the present disclosure, splitting up operation of the active valves requires two additional solenoid valves. This makes it possible to open all of the active valves at the same time, and allow free flow of fluid through the apparatus 1900, with little or no restriction or pressure drop. This is the same for other embodiments described above and within the scope of the present disclosure.

However, the embodiment depicted in FIG. 19 comprises an additional poppet valve PV5 (pilot to close), which as associated with control solenoid valve SOL6 (normally closed). The addition of poppet valve PV5 may make it possible to operate the active valves AV1-AV4 without dead heading the displacement unit 692. The pump pressure going to the displacement unit 692 will first go through the additional poppet valve PV5 and then to the remaining poppet valves PV1-PV4 that control the movement of the displacement unit 692. The poppet valve PV5 makes it possible to block the flow of oil to the displacement unit 692.

The initiation of the pump 693 is to open all of the valves. Then turn solenoid valve SOL3 on, deactivate all other solenoid valves, and run the pump 693 until full pressure is reached. The displacement unit 692 will need to dead head to get the full pump output pressure needed to open the valves. The pump 693 is stopped when full pressure is reached, and solenoid valve SOL3 is turned off. Then, all of the valves are opened.

To automatically control the operation of the displacement unit 692, the state of a sensor of the position of the piston of the displacement unit 692 may be recorded at this point, and may be used later as part of the control scheme. Such piston position sensor is indicated by reference numeral 1310 in FIG. 19 (as well as in FIG. 13). The piston position sensor 1310 may be utilized in conjunction with the control circuit, which may only look at the piston position signal 1310 to see when it chances state, indicating that the displacement unit 692 is at one end or the other.

The initialization is performed as above in order to have the displacement unit 692 at the end of it's travel and solenoid valve SOL3 in a set state. This sets up the displacement unit 692 and solenoid valve SOL3 so that they are ready to go into the normal steps listed for pumping.

Additionally, the pump 693 should not be stopped in the middle of changing the direction of the displacement unit 692. If the pump 693 is stopped before the change is completed, solenoid valve SOL3 would be in the wrong state to follow the normal start-up and run sequence. To explain this, consider the case where the displacement unit 692 is stopped at the end of the stroke after the piston position sensor 1310 changes state, but before solenoid valve SOL3 is able to change. When pumping resumes, the state of solenoid valve SOL3 would still be set for the direction that would take the piston of the displacement unit 692 toward the end of its stroke, and since the piston position sensor 1310 had already changed, it will not change again, so nothing will cause solenoid valve SOL3 to change. The piston of the displacement unit 692 would then travel to the end of its stroke and dead head. Moreover, full hydraulic pressure cannot be used as a backup indicator, since at maximum output the pump output pressure will be maximum throughout the duration of pumping.

Another way to ensure against accidentally getting out of sequence during start-up is to use a new output taken from the output of the piston position sensor 1310. During initialization, the state of the piston position sensor 1310 may be noted at the end of the sequence. This will indicate at which end of the displacement unit 692 the piston last changed direction. At the end of the initialization sequence, the displacement unit 692 will be in the uphole position, so the state of the piston position sensor 1310 at the time will be equated to the displacement unit 692 being in the uphole position. This output could be referred to in several ways. One possible reference may be "LE" for "last end." Thus, at the end of the initialization sequence, LE would be set to "UH," for "uphole." The output may remain LE until the piston position sensor 1310 changed state, and may then transfer to "DH," for "downhole." The LE output could then be used in the start-up sequence, by having the displacement unit 692 go to the opposite end of the LE output. Thus, if the LE is UH, then the displacement unit 692 would be started out going downhole. This is what is automatically done with the standard start and run sequences below, but this new output could be used as a backup check, or the primary control sequence.

The normal pumping cycle would start by closing the valves that need to be closed for the desired direction of pumping. The direction of pumping is determined by the combination of check valve settings and the direction of the displacement unit 692, and is detailed in FIG. 19. The sequence may be as follows:

1. Activate solenoid valve SOL6, and change the solenoid valves to get the required valve settings for the desired direction of pumping.

2. Start the pump 693.

3. When pump pressure reaches a predetermined level (e.g., about 4000 psi), deactivate solenoid valve SOL6 to start pumping.

4. When the pump position sensor 1310 changes state (or when otherwise desired), activate solenoid valve SOL6.

5. Set the appropriate solenoid valves to close all active valves AV1-AV4, such that pressure will initially drop but then return to the predetermined level (e.g., 4000 psi) when the active valves are closed.

6. Change solenoid valve SOL3 to change the direction of the displacement unit 692.

7. Change the solenoid valves to open the required two active valves. The pump pressure will initially drop and return to the predetermined level (e.g., 4000 psi) when the active valves are opened.

8. Deactivate solenoid valve SOL6. This will start the motion of the displacement unit 692.

9. Return to step 4 to continue pumping.

To stop pumping and open all valves, the sequence may be as follows:

1. Activate solenoid valve SOL6.

2. Change the state of the solenoid valves required to open all active valves. Pump pressure will initially drop and then return to the predetermined level (e.g., 4000 psi) when the valves are opened.

3. Stop the pump, and deactivate solenoid valve SOL6.

To stop pumping and hold pressure, the sequence may be as follows:

1. Activate solenoid valve SOL6 and the required solenoid valves to close all active valves. Pump pressure will initially drop and then return to the predetermined level (e.g., 4000 psi) when the valves are closed.

2. Stop the pump, and deactivate solenoid valve SOL6.

Even though solenoid valve SOL6 is used in the steps above as part of the process of opening or closing the valves, an option could be added to not use solenoid valve SOL6 if the differential pressure was greater than some predetermined minimum (e.g., around 500 to 700 psi). The reason the differential pressure would need to be above some predetermined minimum is that if the pressure is not high enough the valves may not open fully, so the potential for erosion of the valve is much higher. The steps of the operation would be the same except for an reference to solenoid valve SOL6.

The initiation of the pumpout would be done the same way. All solenoid valves would be deactivated and the pump 693 would be run until full pressure is reached. The displacement unit 692 will need to dead head to get the full pump output pressure to open the valves. When full pressure is reached, the pump is stopped, and all active valves are opened. The pumping sequence may be as follows:

1. Turn on solenoid valves SOL1, SOL2, SOL4 and SOL5 to close all active valves.
2. Start the pump 693. The displacement unit 692 will need to dead head to build up enough pressure to close the active valves, so this first stroke will not pump any fluid.
3. When the pump pressure reaches a predetermined level (e.g., 4000 psi), the state of the solenoid valve SOL3 is changed and other solenoid valves are set to open the required two valves to get the desired pumping direction. The pressure will initially drop and then increase, as the valves are opening, and will then stabilize at the normal pumping pressure when the active valves are fully open.
4. When the pump position sensor 1310 changes state, the solenoid valves are set to close all active valves. The pressure will initially drop and then return to the predetermined level (e.g. 4000 psi) when the active valves are closed.
5. Solenoid valve SOL3 is changed to reverse the direction of the displacement unit 692.
6. The solenoid valves are changed to open the required two active valves. The pressure will initially drop and then build up as the valves are opening, and then settle to the normal pumping pressure when the active valves are fully open.
7. Return to step 4 above to continue pumping.

To stop pumping and open all active valves, the sequence may be as follows:

1. Change the state of the solenoid valves required to open all valves. Pump pressure will initially drop and then return to the predetermined level (e.g., 4000 psi) when the valves are opened. The displacement unit 692 will need to go to the end of it's stroke in order to build up full pressure to fully open the valves.
2. Stop the pump 693 when pump pressure reaches the predetermined level (e.g., 4000 psi).

To stop pumping and hold pressure, the sequence may be as follows:

1. Activate the required solenoid valves to close all valves. Pump pressure will initially drop and then return to the predetermined level (e.g., 4000 psi) when the valves are closed.
2. Stop the pump 693.

Not using solenoid valve SOL6 may accelerate up the time required to reverse the displacement unit 692. However, either way, the switching time should not be much longer, if any.

Another possible utilization of this system would be to minimize the pressure across the output valves as they open during the direction change of the displacement unit 692. The first step in changing direction of the displacement unit 692 is to close all of the active valves, and then open the two valves required for the next cycle. The active valve that connects the output to the side of the displacement unit 692 that will now be pushing fluid out will have full differential pressure across it, since the volume in the displacement unit 692 is still at formation pressure. The following process may provide at least some measure of pressure balance on the active valve before it opens. This may help minimize erosion of parts and decompression of the fluid in the valve. The following steps would be substituted for steps 4 through 8 in the normal pumping sequence listed above.

A. When the pump position sensor 1310 changes state, solenoid valve SOL6 is activated, and other solenoid valves are set to close all active valves. Pressure will initially drop and then return to the predetermined level (e.g., 4000 psi) when the active valves are closed.

B. Change the state of solenoid valve SOL3 to change the direction of the displacement unit 692.

C. Solenoid valve SOL6 is deactivated.

D. When pump pressures reaches the average pumping pressure in the last cycle, set the solenoid valves to open the required valves for this pump cycle. The actual pressure to use for this step may be some percentage of the actual average, based on pumping speed, etc., to come as close as possible to getting the pressure balanced when the valve actually opens.

E. If the pump pressure drops below some minimum value, then activate solenoid valve SOL6 and wait until the pump pressure returns to the predetermined level (e.g., 4000 psi), and then deactivate solenoid valve SOL6. Some minimum pressure is required to ensure that the valve opens fully.

A check may be added when the sampling device is retracted or deflated, or when all the other probe or packer tools are inactive. An additional or alternative check may be verification that the pump valves are all open when the cable is moved. If the cable moves and the pump valves are not all open, then a warning may be presented, indicating that the pump valves need to be open when the tool is in motion.

Figure 20:
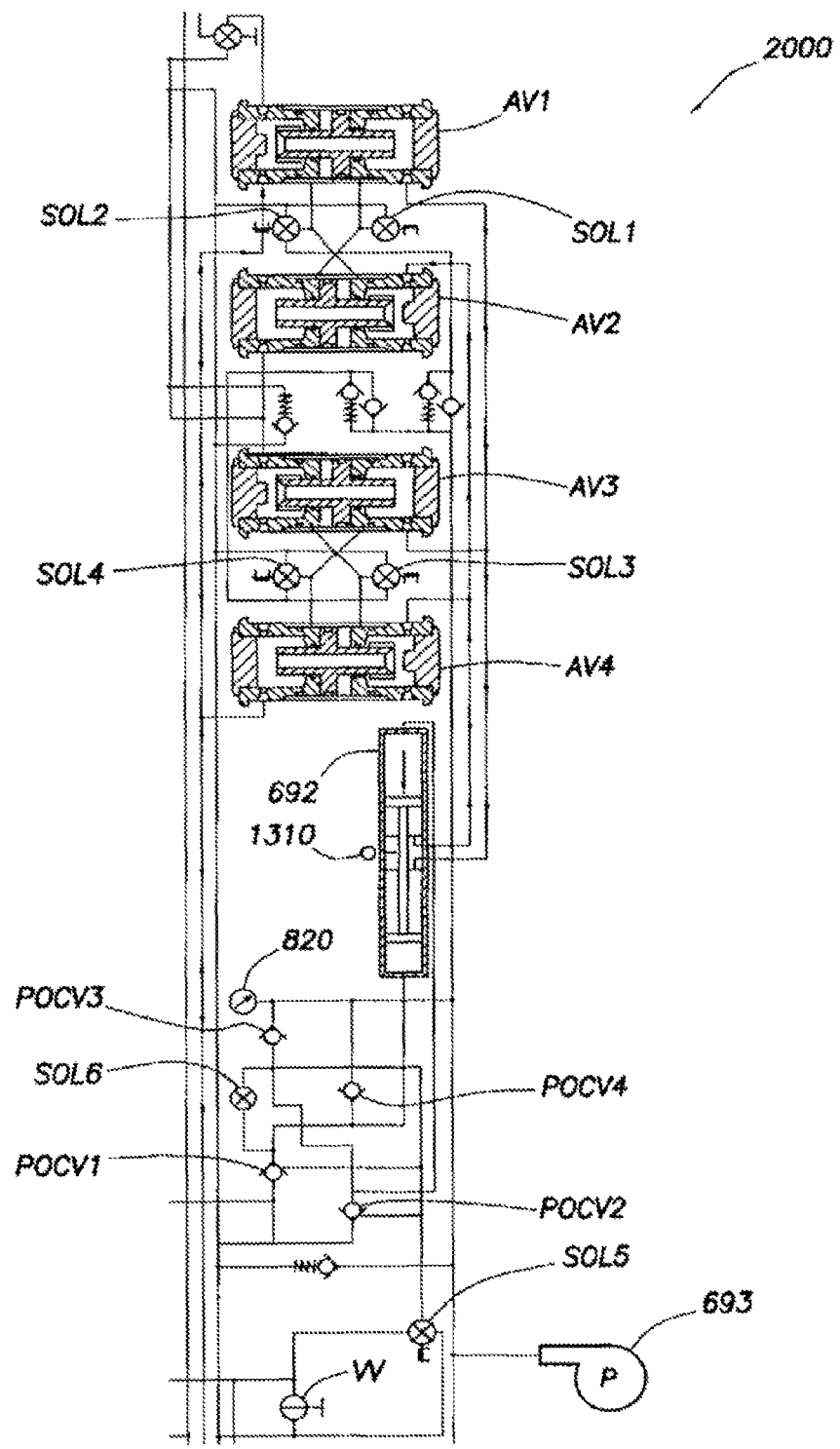
FIG. 20 is a schematic view of apparatus according to one or more aspects of the present disclosure.

Referring to FIG. 20, shown is a schematic view of an apparatus 2000 according to one or more aspects of the present disclosure. The apparatus 2000 is or comprises a mud valve system for a positive displacement pump/unit, which may be substantially similar to those described above, with the following exceptions. For example, the apparatus 2000 includes displacement unit 692, hydraulic pump 693, active valves AV1-AV4, and solenoid valves SOL1-SOL6. However, the apparatus 2000 also comprises piloted operated check valves POCV1-POCV4.

The apparatus 2000 may be configured for sequencing using equalization, which may facilitate the opening of active mud valves against potentially high differential pressures. This embodiment permits equalizing the hydraulic fluid pressure across the piston of the displacement unit 692. Without equalization of the displacement unit 692, one or more of the active valves AV1-AV4 may be required to be opened against potentially high differential pressure.

There are, however, other benefits/uses that may also be noted. For example, equalizing the pressure may minimize safety hazards when servicing the pump 693. Thus, the apparatus 2000 may be retrieved to the surface with little or no trapped pressure in the tool, thereby improving safety and the durability of the pump 693.

The hydraulic fluid from the hydraulic pump 693 is routed to the displacement unit 692 via piloted operated check valves POCV1-POCV4, which are controlled by a single solenoid valve SOL5. Piloted operated check valves POCV2 and POCV4 may be "normally closed, pilot to open," and piloted operated check valves POCV1 and POCV3 may be "normally open, pilot to close." In addition, a valve VV driven by SOL6 is a two-way, two-position valve that may be normally closed, and that may be opened to equalize the displacement unit 692.

The sequence may start with a step that is similar to FIG. 10 (pumping with the reciprocating moving to the right, as shown on the figure above). When the reciprocating reaches the end of a stroke, the pumping system may be configured in a way similar to that shown in FIG. 11, where all active valves AV1-AV4 are closed by switching solenoid valves SOL1 and SOL2.

Figure 21:
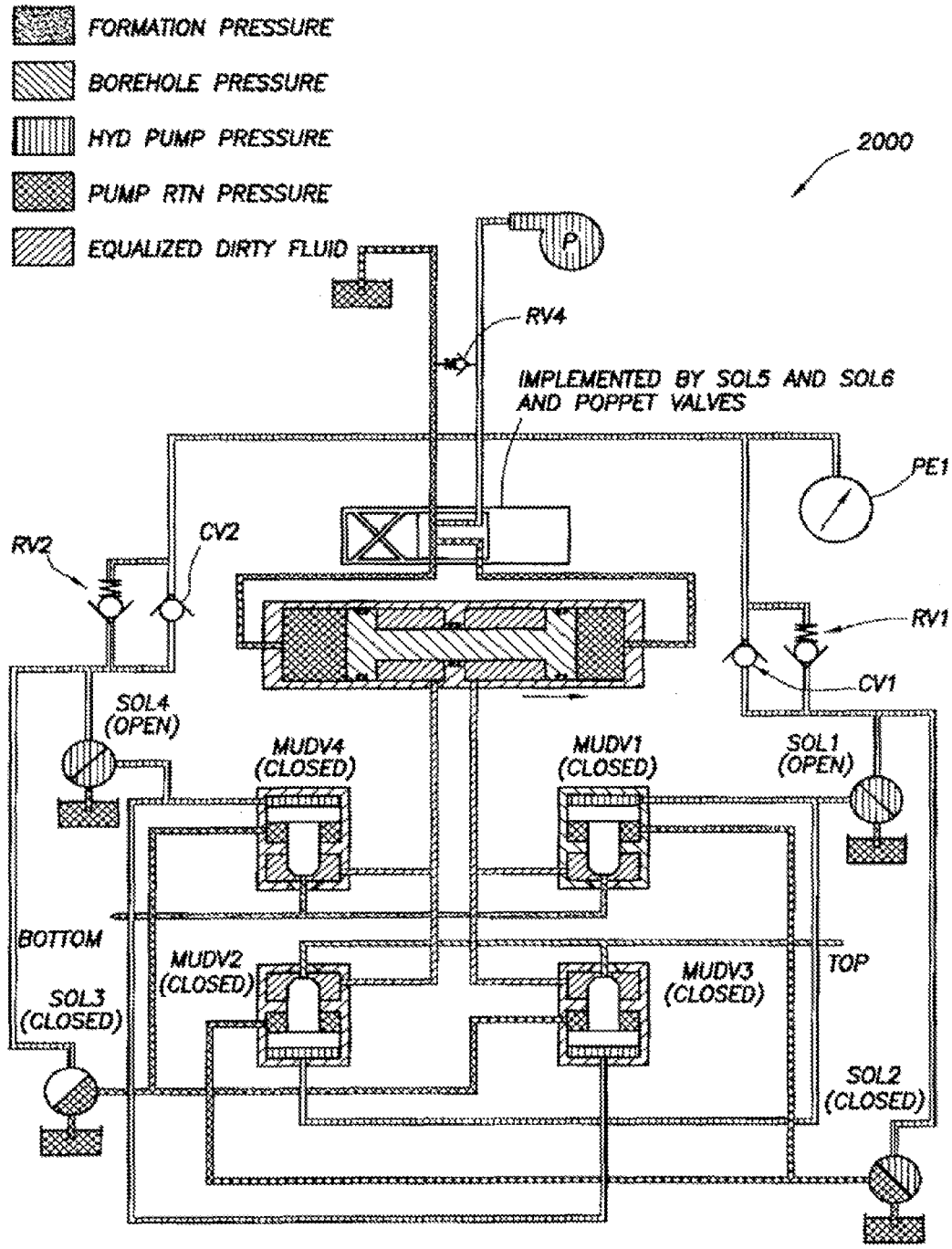
FIG. 21 is a schematic view of the apparatus shown in FIG. 20.

Thereafter, by switching solenoid valve SOL6, the hydraulic pump 693 is short-circuited. The apparatus 2000 (i.e., the hydraulic reservoir) is compensated to borehole pressure. Both sides of the displacement unit 692 are referenced to the hydraulic oil reservoir pressure, usually compensated slightly above wellbore pressure, as show below in FIG. 21. Therefore, after switching solenoid valve SOL6, the pressure will be equalized between the two sides of the displacement unit 692. Considering that the volume on the side of the displacement unit 692 that is connected to the formation is much larger than the volume on the side of the displacement unit 692 that is at borehole pressure, the equalized dirty fluid pressure will be very close to the formation pressure. This may limit the pressure shock on the formation when active valve AV4 opens.

Then, solenoid valve SOL5 may be actuated, while the hydraulic pump 693 is short-circuited. Active valves AV1-AV4 will not move, since there is no pressure to activate them, with solenoid valve SOL6 shorting out the pump output. Finally, solenoid valves SOL3 and SOL4 may be switched. The trapped pressure between the piloted operated check valve POCV2 and the active valves AV3 and AV4, which is trapped when the piston of the displacement unit 692 reaches the end of stroke while the pump 693 is still running, will assist the opening of the valves, even if the pump 693 is short-circuited. However, only active valve AV4 may open. Active valve AV4 may, in fact, open enough to equalize the pressure between the bottom flow line and the end of the displacement unit 692 to which it is connected, since the pressure differential across it is small. Active valve AV3, still under differential pressure, may remain closed.

Finally, solenoid valve SOL6 is returned to its normal position. Pressure may build-up in the hydraulic circuit, the active valves AV1-AV4 should move, and the displacement unit 692 will start in the opposite direction. At some point, active valve AV3 will be balanced and will easily open.

In view of all of the above, it should be readily apparatus to those skilled in the art that the present disclosure introduces a downhole tool pumping apparatus comprising a body and an active valve block. The body comprises a cavity housing a reciprocating piston defining first and second chambers within the cavity. The active valve block comprises a plurality of active valves, wherein the plurality of active valves includes a first active valve fluidly connected to the first chamber of the body, the plurality of active valves includes a second active valve fluidly connected to the second chamber of the body, and each of the plurality of active valves is configured to be actively actuated between open and closed positions.

Each of the plurality of active valves may comprise a check valve and a relief valve. Each relief valve may have a relief pressure setting of about 3500 psi. Each relief valve may have a relief pressure setting between a pumping pressure of the reciprocating piston and a maximum output pressure of a hydraulic pump configured to provide hydraulic power to the reciprocating piston The plurality of active valves may further comprise a third active valve fluidly connected to the first chamber of the body and a fourth active valve fluidly connected to the second chamber of the body. The pumping apparatus may further comprise a hydraulic pump, a first solenoid valve fluidly connected between the hydraulic pump and each of the first, second, third and fourth active valves, and a second solenoid valve fluidly connected between the hydraulic pump and each of the first, second, third and fourth active valves. The first solenoid valve may be configured to supply hydraulic fluid from the hydraulic pump to: the first active valve to open the first active valve; the second active valve to close the second active valve; the third active valve to close the third active valve; and the fourth active valve to open the fourth active valve. The second solenoid valve may be configured to supply hydraulic fluid from the hydraulic pump to: the first active valve to close the first active valve; the second active valve to open the second active valve; the third active valve to open the third active valve; and the fourth active valve to close the fourth active valve. The first solenoid valve may be normally open, and the second solenoid valve may be normally closed.

In another embodiment, the plurality of active valves may further comprise a third active valve fluidly connected to the first chamber of the body and a fourth active valve fluidly connected to the second chamber of the body, and the pumping apparatus further comprises: a hydraulic pump; a first solenoid valve fluidly connected between the hydraulic pump and each of the first and fourth active valves; a second solenoid valve fluidly connected between the hydraulic pump and each of the second and third active valves; a third solenoid valve fluidly connected between the hydraulic pump and each of the first and fourth active valves; and a fourth solenoid valve fluidly connected between the hydraulic pump and each of the second and third active valves. The first solenoid valve may be configured to supply hydraulic fluid from the hydraulic pump to: the first active valve to close the first active valve; and the fourth active valve to close the fourth active valve. The second solenoid valve may be configured to supply hydraulic fluid from the hydraulic pump to: the second active valve to close the second active valve; and the third active valve to close the third active valve. The third solenoid valve may be configured to supply hydraulic fluid from the hydraulic pump to: the first active valve to open the first active valve; and the fourth active valve to open the fourth active valve. The fourth solenoid valve may be configured to supply hydraulic fluid from the hydraulic pump to: the second active valve to open the second active valve; and the third active valve to open the third active valve. The first solenoid valve may be normally closed, the second solenoid valve may be normally open, the third solenoid valve may be normally open, and the fourth solenoid valve may be normally closed.

In an exemplary embodiment, the pumping apparatus may further comprise a plurality of substantially similar pumping modules including: a first pumping module comprising the body, the reciprocating piston and the active valve block; and a second pumping module comprising an additional body, an additional reciprocating piston within a cavity of the additional body, and an additional active valve block, wherein the active valve block of the first pumping module is fluidly connected to the additional active valve block of the second pumping module.

In an exemplary embodiment, the reciprocating piston may be a dog-bone piston having first and second piston heads on opposite ends of a common piston rod, the cavity of the body may comprise first and second cavities, the first cavity may comprise the first chamber, the second cavity may comprise the second chamber, the first piston head may divide the first cavity into the first chamber and a third chamber, and the second piston head may divide the second cavity into the second chamber and a fourth chamber. Such pumping apparatus may further comprise a four-way valve having a first port fluidly connected to a hydraulic pump, a second port fluidly connected to a hydraulic reservoir, a third port fluidly connected to the third chamber of the body, and a fourth port fluidly connected to the fourth chamber of the body. Such pumping apparatus may alternatively comprise a first poppet valve fluidly connected between the hydraulic pump and the third chamber of the body, a second poppet valve fluidly connected between the hydraulic pump and the fourth chamber of the body, a third poppet valve fluidly connected between the fourth chamber of the body and a hydraulic reservoir, and a fourth poppet valve fluidly connected between the third chamber of the body and the hydraulic reservoir. A first solenoid valve may be fluidly connected between a hydraulic fluid source and each of the first and third poppet valves, and a second solenoid valve may be fluidly connected between the hydraulic fluid source and each of the second and fourth poppet valves.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A pumping apparatus of a downhole tool, comprising:
a body having a cavity housing a reciprocating piston defining first and second chambers within the cavity, and
an active valve block comprising a plurality of active valves, wherein the plurality of active valves includes a first active valve fluidly connected to the first chamber of the body, the plurality of active valves includes a second active valve fluidly connected to the second chamber of the body, and each of the plurality of active valves is configured to be actively actuated between open and closed positions
wherein the plurality of active valves further comprises a third active valve fluidly connected to the first chamber of the body, the plurality of active valves further comprises a fourth active valve fluidly connected to the second chamber of the body, and the pumping apparatus further comprises:
a hydraulic pump;
a first solenoid valve fluidly connected between the hydraulic pump and each of the first, second, third and fourth active valves; and
a second solenoid valve fluidly connected between the hydraulic pump and each of he first, second, third and fourth active valves.

2. The pumping apparatus of claim 1 wherein:
the first solenoid valve is configured to supply hydraulic fluid from the hydraulic pump to:
the first active valve in order to open the first active valve;
the second active valve in order to close the second active valve;
the third active valve in order to close the third active valve; and
the fourth active valve in order to open the fourth active valve; and
the second solenoid valve is configured to supply hydraulic fluid from the hydraulic pump to:
the first active valve in order to close the first active valve;
the second active valve in order to open the second active valve;
the third active valve in order to open the third active valve; and
the fourth active valve in order to close the fourth active valve.

3. The pumping apparatus of claim 1 wherein the first solenoid valve is normally open and the second solenoid is normally closed.

4. A pumping apparatus of a downhole tool, comprising:
a body having a cavity housing a reciprocating piston defining first and second chambers within the cavity; and
an active valve block comprising a plurality of active valves, wherein the plurality of active valves includes a first active valve fluidly connected to the first chamber of the body, the plurality of active valves includes a second active valve fluidly connected to the second chamber of the body, and each of the plurality of active valves is configured to be actively actuated between open and closed positions wherein the plurality of active valves further comprises a third active valve fluidly connected to the first chamber of the body, the plurality of active valves further comprises a fourth active valve fluidly connected to the second chamber of the body, and the pumping apparatus further comprises:
a hydraulic pump;
a first solenoid valve fluidly connected between the hydraulic pump and each of the first and fourth active valves;
a second solenoid valve fluidly connected between the hydraulic pump and each of the second and third active valves;
a third solenoid valve fluidly connected between the hydra pump and each of the first and fourth active valves; and
a fourth solenoid valve fluidly connected between the hydraulic pump and each of the second and third active valves.

5. The pumping apparatus of claim 4 wherein:
the first solenoid valve is configured to supply hydraulic fluid from the hydraulic pump to:
the first active valve in order to close the first active valve; and
the fourth active valve in order to close the fourth active valve;
the second solenoid valve is configured to supply hydraulic fluid from the hydraulic pump to:
the second active valve in order to close the second active valve; and
the third active valve in order to close the third active valve;
the third solenoid valve is configured to supply hydraulic fluid from the hydraulic pump to:
the first active valve in order to open the first active valve; and
the fourth active valve in order to open the fourth active valve; and
the fourth solenoid valve is configured to supply hydraulic fluid from the hydraulic pump to:
the second active valve in order to open the second active valve; and
the third active valve in order to open the third active valve.

6. The pumping apparatus of claim 4 wherein the first solenoid valve is normally closed, the second solenoid valve is normally open, the third solenoid valve is normally open, and the fourth solenoid valve is normally closed.

7. A pumping apparatus of a downhole tool, comprising:
a body having a cavity housing a reciprocating piston defining first and second chambers within the cavity; and
an active valve block comprising a plurality of active valves, wherein the plurality of active valves includes a first active valve fluidly connected to the first chamber of the body, the plurality of active valves includes a second active valve fluidly connected to the second chamber of the body, and each of the plurality of active valves is configured to be actively actuated between open and closed positions wherein the cavity of the body comprises first and second cavities, the first cavity comprises the first chamber, the second cavity comprises the second chamber, a first portion of the piston divides the first cavity into the first chamber and a third chamber, and a second portion of the piston divides the second cavity into the second chamber and a fourth chamber further comprising a four-way valve having a first port fluidly connected to a hydraulic pump, a second port fluidly connected to a hydraulic reservoir, a third port fluidly connected to the third chamber of the body, and a fourth port fluidly connected to the fourth chamber of the body.

8. The pumping apparatus of claim 7 further comprising a hydraulic pump, a solenoid valve, and first, second, third and fourth poppet valves, wherein the hydraulic pump is fluidly connected to the first and second chambers via the first, second, third and fourth poppet valves, and wherein the first, second, third and fourth poppet valves are all controlled by the solenoid valve.

9. The pumping apparatus of claim 8 wherein the first and third poppet valves are normally open and pilot to close, and wherein the second and fourth poppet valves are normally closed and pilot to open.

10. The pumping apparatus of claim 8 further comprising an additional solenoid valve and a two-way, two-position valve driven by the additional solenoid valve, wherein the two-way, two-position valve is configured to be opened to equalize pressure of the first and second chambers of the body.

11. A pumping apparatus of a downhole tool, comprising:
a body having a cavity housing a reciprocating piston defining first and second chambers within the cavity; and
an active valve block comprising a plurality of active valves, wherein the plurality of active valves includes a first active valve fluidly connected to the first chamber of the body, the plurality of active valves includes a second active valve fluidly connected to the second chamber of the body, and each of the plurality of active valves is configured to be actively actuated between open and closed positions wherein the cavity of the body comprises first and second cavities, the first cavity comprises the first chamber, the second cavity comprises the second chamber, a first portion of the piston divides the first cavity into the first chamber and a third chamber, and a second portion of the piston divides the second cavity into the second chamber and a fourth chamber further comprising a first poppet valve fluidly connected between the hydraulic pump and the third chamber of the body, a second poppet valve fluidly connected between the hydraulic pump and the fourth chamber of the body, a third poppet valve fluidly connected between the fourth chamber of the body and a hydraulic reservoir, and a fourth poppet valve fluidly connected between the third chamber of the body and the wellbore annulus.

12. The pumping apparatus of claim 11 further comprising first and second solenoid valves, wherein the first solenoid valve is fluidly connected between a hydraulic fluid source and each of the first and third poppet valves, and the second solenoid valve is fluidly connected between the hydraulic fluid source and each of the second and fourth poppet valves.

13. The pumping apparatus of claim 12 wherein the plurality of active valves further comprises a third active valve fluidly connected to the first chamber of the body, the plurality of active valves further comprises a fourth active valve fluidly connected to the second chamber of the body, and the pumping apparatus further comprises a hydraulic pump and a plurality of additional solenoid valves connected between the hydraulic pump and ones of the first, second, third and fourth active valves.

14. The pumping apparatus of claim 13 wherein the hydraulic fluid source connected to the first, second, third and fourth poppet valves is the hydraulic pump connected to the plurality of additional solenoid valves.

\* \* \* \* \*